(12) United States Patent
Bevan

(10) Patent No.: US 8,788,565 B2
(45) Date of Patent: Jul. 22, 2014

(54) DYNAMIC AND DISTRIBUTED QUEUEING AND PROCESSING SYSTEM

(76) Inventor: Wayne Bevan, Hollister, CA (US)

( * ) Notice: Subject to any disclaimer, the term of this patent is extended or adjusted under 35 U.S.C. 154(b) by 1848 days.

(21) Appl. No.: 11/482,481

(22) Filed: Jul. 6, 2006

(65) Prior Publication Data

US 2007/0013948 A1    Jan. 18, 2007

Related U.S. Application Data

(60) Provisional application No. 60/700,512, filed on Jul. 18, 2005.

(51) Int. Cl.
*G06F 15/16* (2006.01)
(52) U.S. Cl.
USPC .......................... 709/201; 705/7.26; 705/301
(58) Field of Classification Search
None
See application file for complete search history.

(56) References Cited

U.S. PATENT DOCUMENTS

| | | | |
|---|---|---|---|
| 5,515,428 A | 5/1996 | Sestak | |
| 5,745,687 A | 4/1998 | Randell | |
| 5,870,605 A | 2/1999 | Bracho et al. | |
| 5,940,840 A | 8/1999 | Eshel | |
| 5,960,404 A * | 9/1999 | Chaar et al. | 709/202 |
| 6,192,413 B1 | 2/2001 | Lee | |
| 6,442,528 B1 * | 8/2002 | Notani et al. | 705/9 |
| 2003/0182656 A1 * | 9/2003 | Leathers et al. | 717/177 |
| 2006/0282474 A1 * | 12/2006 | MacKinnon, Jr. | 707/200 |
| 2007/0033088 A1 * | 2/2007 | Aigner et al. | 705/9 |

OTHER PUBLICATIONS

W.M.P. Van Der Aalst et al., Advanced Workflow Patterns, International Conference on Cooperative Information Systems, 2000, pp. 1-23, Eilat, Israel.

* cited by examiner

*Primary Examiner* — Thomas Dailey
*Assistant Examiner* — Nam Tran
(74) *Attorney, Agent, or Firm* — Donald R. Boys; Central Coast Patent Agency, Inc.

(57) ABSTRACT

A data processing network for processing work items according to a business process has one or more processing boundaries having connection to a data transfer network, one or more communication brokers distributed among and executable on the one or more processing boundaries, and a plurality of electronic queues distributed among the one or more processing boundaries, the queues managed by the one or more communications brokers.

8 Claims, 25 Drawing Sheets

DYNAMIC AND DISTRIBUTED QUEUEING AND PROCESSING SYSTEM

CROSS-REFERENCE TO RELATED APPLICATIONS

The present invention claims priority to a U.S. provisional application for patent Ser. No. 60/700,512 entitled "A Dynamic Distributed Queuing and Decision System" filed on Jul. 18, 2005, which is incorporated herein by reference.

BACKGROUND OF THE INVENTION

1. Field of the Invention

The present invention is in the field of data processing and pertains particularly to methods and apparatus for creating and maintaining a dynamically distributed data queuing and processing system or systems over one or more network topologies.

2. Discussion of the State of the Art

In the field of data processing the concept of an automated or semi-automated workflow engine is common and is currently realized within a wide variety of business market segments from telecommunications, prioritization and voice interaction, to that of the financial market segment for stock order and trade executions. Most modern market segments have high transactional throughput as well as strict demands for service levels of such workflow systems for them to be able to carry out their complex business transactions.

In many market segments there is no "single" workflow engine dominance. It is typical in the art to have different workflow engines performing different tasks on different data sets within a single enterprise. Corporations are under increased pressure to become more efficient. Many have turned to third-party information technology (IT) vendors to help resolve issues resulting from too many workflow engines. In order to simplify and unify data processing, much expenditure in re-tooling is required. Many workflow processes are hard coded for the nature of and architecture of the business and cannot be easily changed or upgraded. Many companies rely on a central data store to store all of the workflow data being processed.

Therefore, a platform and framework is needed for incorporating multiple and variant workflow items to be processed across multi-node topologies and multiple enterprise boundaries if required using a single distributed workflow framework that is dynamic and that may be easily modified during runtime. A framework such as this would greatly reduce quality and service inefficiencies experienced in today's business transactional markets.

SUMMARY OF THE INVENTION

In an embodiment of the invention a data processing network for processing work items according to a business process is provided, comprising one or more processing boundaries having connection to a data transfer network, one or more communication brokers distributed among and executable on the one or more processing boundaries, and a plurality of electronic queues distributed among the one or more processing boundaries, the queues managed by the one or more communications brokers.

In one embodiment the processing boundaries are one or a combination of servers, desktop computers, laptop computers, or personal digital assistants. Also in one embodiment the data transfer network is enabled for transfer control protocol over Internet protocol (TCP/IP) and universal datagram protocol (UDP). In another embodiment the connection to the data transfer network is a wireless connection.

In yet another embodiment of the network the connection to the data transfer network is a network interface. In still another embodiment the electronic queues comprise publishing queues for publishing work items queued therein and subscribing queues that subscribe to those publishing queues for de-queued work items. In yet another embodiment a work item is one of an email, a voice mail, a chat request, an instant message, a Radio Frequency Identifier Tag (RFIT), or a voice call.

In some other embodiments of the network the electronic queues include final destination queues subscribing to publishing queues. In still other embodiments the electronic queues include intermediary queues that publish work items and subscribe to other queues.

In another aspect, the network may further comprise at least one administration integration component for enabling administrative tasks, and at least one reporting integration component for providing state information. In yet another aspect the network may further comprise at least one access point for externally controlled generation of work items, and at least one queue access point for externally controlled processing of work items. In this embodiment at least one queue access point for externally controlled processing of work items may be associated with an intermediary queue or a final destination queue.

In another aspect of the invention a software module for brokering communication between external processes and a network of electronic queues and integration components associated with those queues is provided, comprising a client interface for brokering communication between publishing, intermediary, and final destination queues and external processing threads operating on those queues, and an application interface for communicating directly with other like modules, administration integration components, and for brokering communication between like modules.

In one embodiment the integration components include one for generating work items for processing, one for performing intermediary processing on work items, and one for performing final processing on work items. In another embodiment the integration components are bridging applications strategically deployed to connect external applications or systems and electronic queues for generating work items and processing those work items. In still another embodiment the module may further comprise an application layer for communicating with a remote graphical user interface (GUI) for the purpose of accepting and acting on a request for deploying a pre-defined queue network over a topology of processing boundaries.

In another aspect of the invention a method for loading and executing a pre-defined queue network onto a topology of processing boundaries is provided, comprising the acts of (a) using an object modeling tool, specify the queue network and its components and relationships between the components; (b) sending a request to a deployed communications broker hosted on one of the processing boundaries to accept and load the queue network; (c) receiving the request at the broker and validating the network queue and deployment scenario; (d) upon validation at act (c), allocating the queues and queue definitions to other like brokers distributed over the topology; (e) opening the queue network to operation; and (f) reporting that the request for loading the queue network was successfully executed.

In one embodiment of the method, in act (a), the object modeling tool is a GUI and the specified components include, but are not limited to, one or more conduit queues, one or more workflow queues, and one or more user queues and the external application integration instances to enable external access to those queues. In another embodiment, in act (a), the relationships between the components include but are not limited to subscription paths between subscriber queues and publisher queues, and communication paths between queues associated with an external process and the application or system providing the process. In another embodiment, in act (b), the deployed broker is one of more than one broker deployed on the topology of processing boundaries. In yet another embodiment, in act (d), the distributing broker is a master broker and the receiving brokers are slave brokers. In still another embodiment, in act (e), opening the queue network involves the master broker sending a request to the slave brokers to activate their received queues for access and processing.

In another aspect of the invention, in a data processing network for processing work items according to a business process, the network including one or more network connected processing boundaries, one or more communication brokers distributed to and executable on the one or more processing boundaries, and a plurality of electronic queues distributed among the one or more processing boundaries, a method for automatic redistribution of one or more components of the network electronic queues according to a trigger event is provided, comprising the acts of (a) detecting a trigger event at one or more communications brokers; (b) inquiring the current state of topology of the queue network and the topology; (c) determining if the trigger event forces reallocation of components of the network of queues; (d) if so at act (c) reallocating the affected components and the definitions of those components to one or more associated communications brokers for redeployment; (e) re-distributing those allocated components; and (f) activating those re-distributed components and updating routing tables.

In one embodiment of this method, in act (a) the trigger event is defined as one or more changes to the network topology over which the queue network is deployed. In another embodiment, in act (a) the trigger event is a discovery of one or more network resources not being utilized or not being adequately utilized.

BRIEF DESCRIPTION OF THE DRAWING FIGURES

DETAILED DESCRIPTION

The inventor provides a distributed queue network for processing work items within an enterprise topology or among more than one enterprise topology. The system requires no central point of processing, data storage or control. The methods and apparatus of the invention are presented in enabling detail in the examples to follow.

Figure 1:
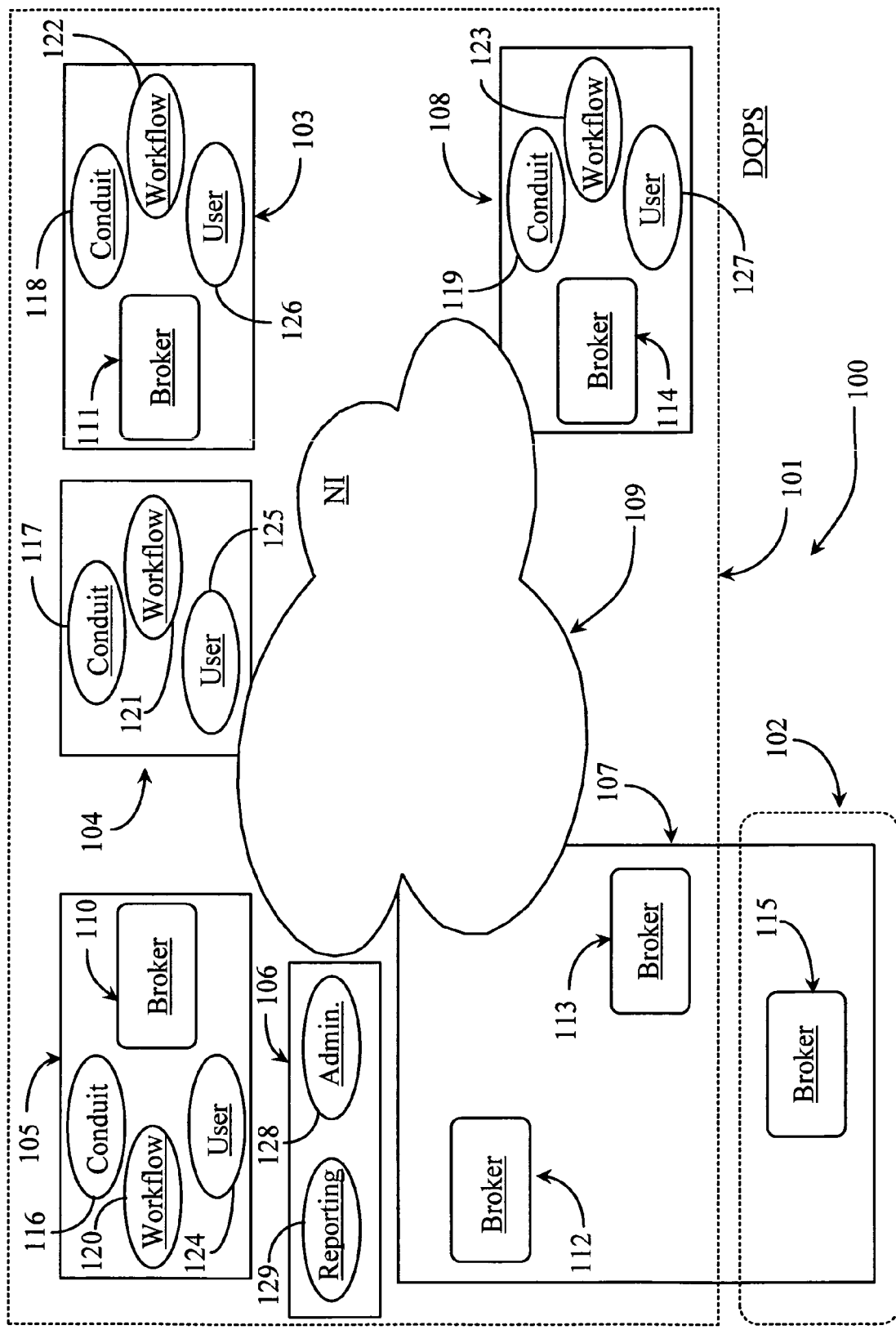
FIG. 1 is a block diagram illustrating a distributed processing queue system (DPQS) according to an embodiment of the present invention.

FIG. 1 is a block diagram illustrating a distributed processing queue system (DPQS) 100 according to an embodiment of the present invention. DQPS 100 may consist of one or more queue networks deployed over one or more topologies, generally defined as a group of processing boundaries or more particularly, processing nodes. An example would be two or more networked server machines or computing appliances of various descriptions, each having CPU processing capabilities, memory and data input/output paths.

In this example, there are two topologies, topology 101 and topology 102. Topology 101 consists of several processing boundaries that may be dedicated or not to certain areas of work item processing. These are processing boundaries 103, 104, 105, 106, and 107. It is clear in this example that processing boundary 107 has an adaptation, which extends it into the domain of topology 2. Topology 102 may belong to another enterprise apart from one maintaining topology 101. Processing boundaries may collectively define a topology that may be heterogeneous or homogeneous in form and function. If a topology has all servers of a single kind and function, the topology would be homogeneous. If variant computing appliances are used as processing boundaries in one topology, then the topology is considered to be heterogeneous.

Each processing boundary may host one or more of specified network queue components. Of these components, each processing boundary may host one or more instances of a communication broker. Communication brokers in this example include brokers 110, 111, 112, 113, 114, and 115 hosted by processing boundaries 105, 103, 107 (brokers 112, 113, and 115), and 108 respectively. It is noted that processing boundary 107 extends into another topology (102). More detail of such inter-topology communication is described later in this specification.

A network infrastructure (NI) 109 is illustrated logically in this example and provides network connectivity for all of the processing boundaries. NI 109 may be the Internet network, an Ethernet network, a municipal area network (MAN), a corporate or private wide area network (WAN), or a combination of these and any sub-networks. NI 109 interconnects all processing boundaries in a given topology for communication. A topology may be designed according to need and may include only one or many networked machines. In one embodiment, a topology may be isolated and network queue components in that isolated topology may only communicate with each other. However, in another embodiment, topologies may be isolated but bridged for communication over a larger network infrastructure such as might be the case of two geographically separated topologies like LAN-connected server groups bridged by a WAN. As long as the required communications and data transfer protocols are supported or successfully converted between gateways, bridges or the like, many topologies may be involved in the initiation and conclusion of a business process common to all of the topologies.

Processing boundaries may communicate with each other according to a wide range of well known network communication and data protocols including but not limited to transfer control protocol over Internet protocol (TCP/IP), recommended standard-232 (RS-232), user datagram protocol (UDP), X.25, 802.11a/b/g or Bluetooth™ wireless technology. The purpose of broker instances is to broker and manage communication between themselves the other components of the distributed system and to maintain overall business processes being executed on the network. A business process may be defined as any transaction or sequence of transactions being performed with relevance to one or more work items.

Each processing boundary may host zero, one or more than one conduit integration component (CIC). The term "integration component" is applied to network queue components that may be interfaced to by an external application for the purpose of local processing within the processing boundary hosting the component. Illustrated CICs are CICs 116, 117, 118, and 119 hosted within processing boundaries 105, 104, 103, and 108 respectively. One of the responsibilities of a CIC is to enable creation and generation of a work item that is a component of a business transaction process defined by an enterprise. CICs enable a third party application or server to generate and submit work items for processing by other applications. A work item may be defined as a unit of work. CICs may support a wide variety of work items or units of work typically generated by external applications such as but not limited to electronic mail, hypertext transfer markup language (HTML) selection, Web-based form interaction, natural or synthesized voice selection, automated database queries, touch screen selection, touch tone response, electronic fax, Radio Frequency Identifier Tags (RFID) and electronic check submission and so on. A work item may include virtually any parcel of an overall transaction that can be represented electronically. A CIC represents a beginning or an entry point, or one of many entry points, into an overall distributed "queue network" that is the electronic architecture for accomplishing an overall business process. It is noted herein that a single business process may utilize more than one defined queue network and there may be more than one business process realized within a single queue network. For example, pre-qualifying for a loan is a separate business process from underwriting the loan for the applicant. The overall business goal is to transact loans.

Each processing boundary hosts zero, one, or more than one instance of workflow integration component (WIC). Illustrated WICs are WICs 120, 121, 122, and 123 hosted on processing boundaries 105, 104, 103, and 108 respectively. A WIC provides accessibility to external applications for the purpose of processing work items staged within the WIC. Applications may access WICs according to predefinition to process work items. A WIC may be thought of as a transit staging point for a work item originally entered into the system via a CIC. A work item may visit one or more than one WIC before exiting the system.

Each processing boundary may host zero, one, or more user integration components (UICs) s. Illustrated user UICs are UICs 124, 125, 126, and 127 hosted by processing boundaries 105, 104, 103, and 108 respectively. A UIC provides a terminal point of processing of a work item. A work item that reaches a UIC is one that entered the system through a CIC and has been interacted with by zero, one, or more WICs. A UIC may be an automated point of processing or may include live handling of the work item. A UIC may have reporting capabilities for reporting processing results back to other components such as the original CIC that facilitated work item generation. UICs may also report to other entities internal to or external from the network.

Each processing boundary may include an administration integration component (AIC). An AIC 128 is illustrated within processing boundary 106 in topology 101. AIC 128 provides a user interface for a network administrator or knowledge worker responsible for creating, initializing, and managing queue networks. An administrator may manage all of the components within a topology of processing boundaries and may load pre-defined queue networks, which constitute realization of a business process definition shared by the community of broker instances deployed over the topology. In one embodiment, AIC also provides cross-topology administration features. The user interface mechanism for accessing an AIC may vary widely and one AIC may support several variant interface types and technologies including but not limited to Web access, console application or "dashboard", touch screen graphical user interface (GUI), voice system interface, or any other input technology that may gain access through a specified administration integration application program interface (AIAPI) not illustrated. A DQPS may be administered by a human operator or by a pre-programmed automated system without departing from the spirit and scope of the present invention.

Each processing boundary may host zero one or more reporting integration components (RICs). An RIC 129 is illustrated within processing boundary 106. RIC 129 provides reporting of processing results and statistics such as the results of terminal processing of work items for billing, data compilation, and other purposes. RIC 129 may be integrated with a billing system, a customer relations management (CRM) database, and other external applications such as may be relevant to the enterprise and business processes practiced. In this example, there is only one RIC 129 and one AIC 128 provided for topology 101. Both are hosted on a single processing boundary 106 with no other DQPS components present in the boundary. Data generated by the other processing boundaries may be reported to processing boundary 106 and administration access from the point of boundary 106 is extended to all of the applicable processing boundaries of the entire system. This should not be construed as a limitation. In one embodiment, there may be more than one AIC and RIC per topology. The exact distribution scheme of the above described components of the invention is flexible according to need. Considerations for distribution of components over a topology of processing boundaries may include processing power, memory size, transactional throughput capabilities, and bandwidth allocations, or the like of the individual nodes in a topology. There are many possible distribution architectures.

One with skill in the art will recognize that there is no central point of control or data storage for the system of the invention. In a preferred embodiment, all of the workflow processing is distributed over the collective nodes of a topology using the queue components of the invention, more specifically the CICs, WICs, and UICs.

Figure 2:
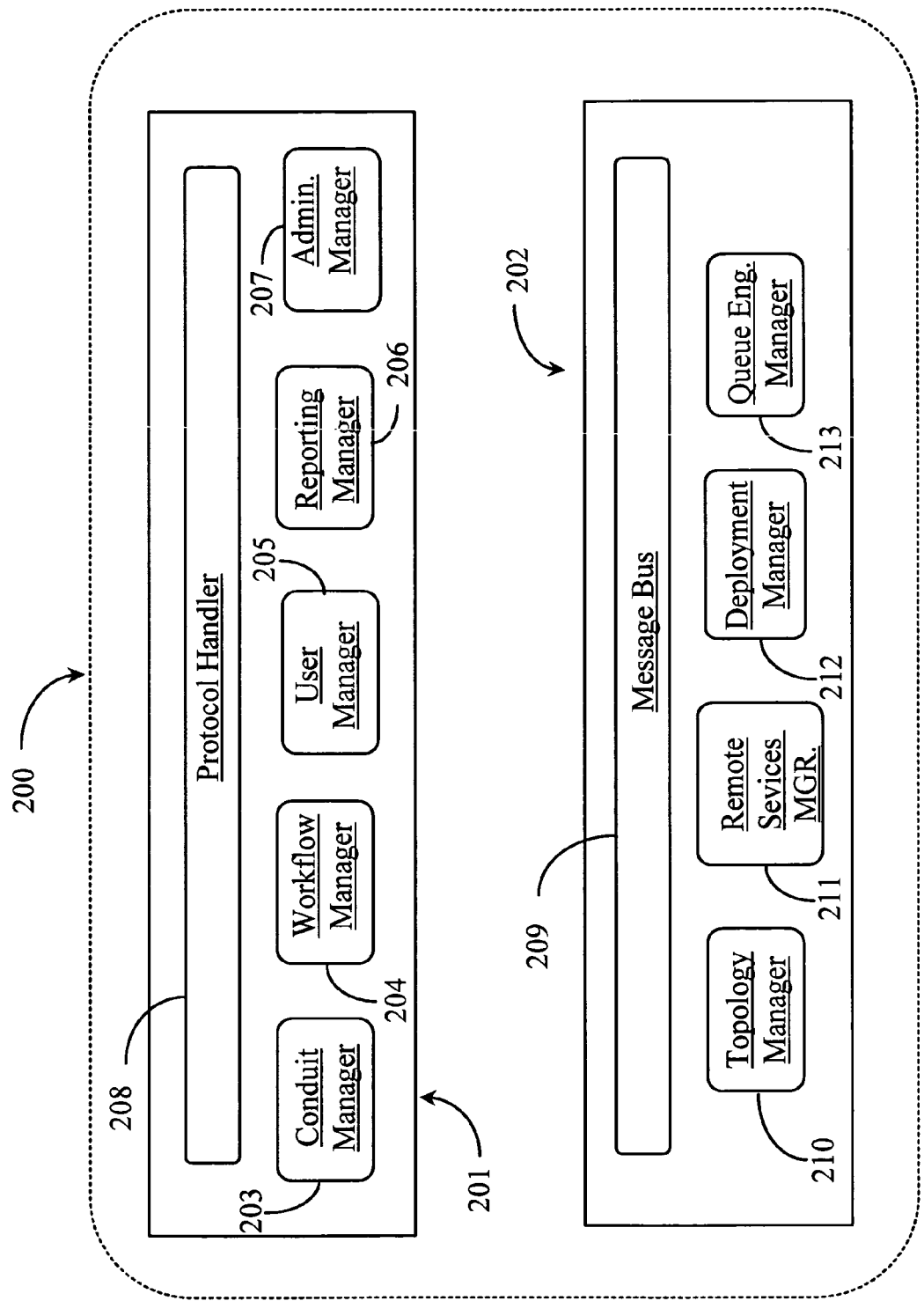
FIG. 2 is a block diagram illustrating components and interface layers of a communications broker instance according to an embodiment of the present invention.

FIG. 2 is a block diagram illustrating components and interface layers of a communications broker instance 200 according to an embodiment of the present invention. Broker 200 is analogous to any of the brokers 110, 111, 112, 113, 114, or 115 described above. Broker 200 has two main software layers supporting interactive components. These are a client services layer 201 and an application layer 202.

Client layer 201 provides an interface for communication to broker 200 for all of the previously described components. As such, each component has a counterpart manager interface within layer 201. These are a conduit manager 203, a workflow manager 204, a user manager 205, a reporting manager 206, and an administration manager 207.

Layer 201 has a protocol handle 208 for ensuring reliable transport and communication protocols between broker 200 and any of the integration instances. For example, for each type of integration component, there is a component manager charged with encapsulating the required services. Protocol handle 208 provides all of the required protocol services needed for communication. Protocol handler 208 may add or remove lower level protocols as might be required to optimize communication between each instance of corresponding component and its manager instance in layer 201. In one embodiment, protocol handler 208 has a capability of converting between known network protocols. Some examples of convertible protocols include but are not limited to RS-232, extensible Markup Language (XML), TCP/IP, UDP, RSS, and others.

Conduit manager 203 provides services to CICs coupled to broker 200 through protocol handler 208. Conduit manager 203 May transmit error events, other events and/or processing results as a result of processing a work item. A conduit manager may allow one or more CICs to manipulate work items through a processing life cycle or during a time to live (TTL) period. CICs may delete, pause, or replicate work items and may generate new work items if needed. Conduit manager 203 supports reporting from connected CICs leveraging administration and reporting instances when required. Any connected CIC may report its state of operation directly to a broker instance or to an external entity through broker 200 and a connected RIC like RIC 129. Likewise, conduit manager may allow AIC and RIC interaction with any connected CIC for maintenance or reporting purposes.

Workflow manager 204 provides services to any WICs coupled to broker 200 through protocol handler 208. Workflow manager 204 may provide a WIC with one or more new work items and instructions for processing including expected processing results. Workflow manager 204 may enable any connected WIC to receive workflow subscription notifications with respect to other network queue elements. Workflow manager 204 may process requests on behalf of any connected WIC such as for more work items as they become available in the system, typically through one or more connected CICs. Workflow manager 204 also supports full reporting capabilities of any connected WIC as described above with respect to conduit manager 203.

User manager 205 provides services to any UICs coupled to broker 200 through protocol handler 208. Services may include full reporting capabilities, processing requests on the behalf of a UIC, and notifying UICs of any pending work item. More detail about queues and queue subscriptions will be provided later in this specification. User manager 205 may provide any connected UICs with one or more work items including processing instructions and expected processing results.

Reporting manager 206 provides services to any RIC coupled to broker 200 via protocol handler 208. Reporting manager 206 may provide notification to RICs of any state changes that have occurred within the distributed queue processing system. Reporting manager 206 may allow any connected RIC to specify which type of notification events it wants to receive. It can do this via a message filter provided to a connected RIC that filters out messages that the RIC does not utilize. Reporting managers 206 may further support the ability of a connected RIC to communicate its state of operation.

Administration manager 207 provides services to any AIC coupled to broker 200 through protocol handler 208. Administration manager may provide notification of any state changes that have occurred within the distributed queue processing system. Administration manager may also allow any connected AIC to interact with and influence any other connected element or elements (integration points) of the distributed queue processing system. For example, administration manager 207 may enable a connected AIC to load one or more queue networks onto the topology; change the state of one or more loaded queue networks or to change the state of any communications broker within the topology. Administration manager may also allow any connected AIC to report its state information.

It will be apparent to one with skill in the art that communication between integration components and their managers within a communications broker is bidirectional and may be asynchronous or synchronous. Appropriate data transfer protocols and mechanisms like collision detection, redundancy elimination, replication, quality of service (QoS) reservation, priority tagging, and other features of network infrastructures may apply over a distributed queue network topology.

Application layer 202 provides common functionality including an internal message bus 209 for facilitating reliable communication between internal components of broker 200. One purpose of message bus 209 is to provide reliable communication between various sub-components of a communication broker. In addition to performing as a common communication bus, message bus 209 may also perform low level debugging tasks. Moreover, bus 209 facilitates recording and playback of information for the purposes of debugging, simulation, or training. In other words, each communication broker may also be communicated with on a multi-media level. Help files, interactive wizards, and the like may be accessible options when interacting with a broker.

To facilitate inter-communication among broker components, all components have a unique identifier that may double as a routing key. An additional identifier component maybe used to facilitate cross-communication between brokers and elements thereof within a topology of processing boundaries. The additional routing key, used with an internal component key, acts as a node identifier. A remote services manager facilitates inter-broker communication within a topology.

Message bus 209 may also provide added services like timing services and access to a common distributed (not central) repository (not illustrated) for timing events, functions and common shared data. For example, a common repository available on a broker may hold configuration values required for component configuration such as TCP/IP or node identification information for inter-node communication. The timing service described further above may provide timeout services for communication sessions extending beyond node processing boundaries and connection maintenance such as "keep connection alive" services known with some other network applications.

Application layer 202 has a topology manager 210. Topology manager 210 is capable of automatically discovering a given network of communications brokers that for the total processing capabilities of a given topology. When started, communications broker 208 broadcasts its information and listens for information broadcast by the other brokers in the topology. The process may be repeated periodically throughout runtime of the broker.

Although described in more detail later, node discovery over a given topology of brokers may include broadcasting, multicasting, domain name service (DNS) lookup, universal description discovery and integration (UDDI), lightweight directory access protocol (LDAP), open database connectivity (ODBC), Java naming and directory interface (JNDI). Other conventions may also be employed like network machine address discovery (MAC) and explicit IP addressing. There are many possibilities depending on the infrastructure supporting the processing boundaries. Once topology manager 210 discovers a node, it informs a remote services manager 211 so a coupling can be made and an association between the brokers may be established and maintained.

Remote services manager 211 manages and maintains connections to all of its peers on a given topology of brokers. It enables information exchange between communications brokers on the topology. Remote services manager may report state information to internal components such as state of connections to other brokers and states of the internal components of those brokers. Remote services manager 210 may also provide additional services like least-cost routing services.

Application layer 202 has a deployment manager 212. Deployment manager 212 oversees deployment of a queue network within a topology of processing boundaries. Deployment manager 212 also maintains information related to how the queue network is distributed over a topology. Consideration for queue deployment includes but is not limited to CPU load, I/O overhead, uptime, reliability and overall capacity. Deployment manager 212 also evaluates current network queue distribution architecture and has the capability of initiating redistribution of one or more distributed queue networks.

Application layer 202 has a queue engine manager 213. Queue engine manager 213 maintains all of the local queues that are active on communication broker 200.

In actual practice, each queue resides on the memory of the node that broker 200 executes on. Persistent storage, main system memory, or a locally accessible storage device may be leverages to store broker queues.

In one embodiment, a single queue engine manager may maintain queues that belong to many different queue networks as long as they all reside within one topology. Queue engine manager 213 facilitates traversal of work items through its queues and therefore interaction with other queue engine managers, message bus 209, and the remote services manager 211 may be required. Queue engine manager 213 may also create shadow queues for fault tolerance and may split queues across more than one processing boundary. Queue engine manager 213 may control the overall life cycle of a queue and TTL of work items staged in a queue that it manages. More detail about work item and queue management will be provided later in this specification.

One with skill in the art will appreciate that a communications broker like broker 200 is an object model including many internal objects that may communicate with each other within the broker or to peer objects included within other brokers on the same topology. The exact functionality of broker 200 and similar peer brokers on a distributed queue network is determined before deployment of the network, but may be modified after deployment and during runtime of the network queue.

Figure 3:
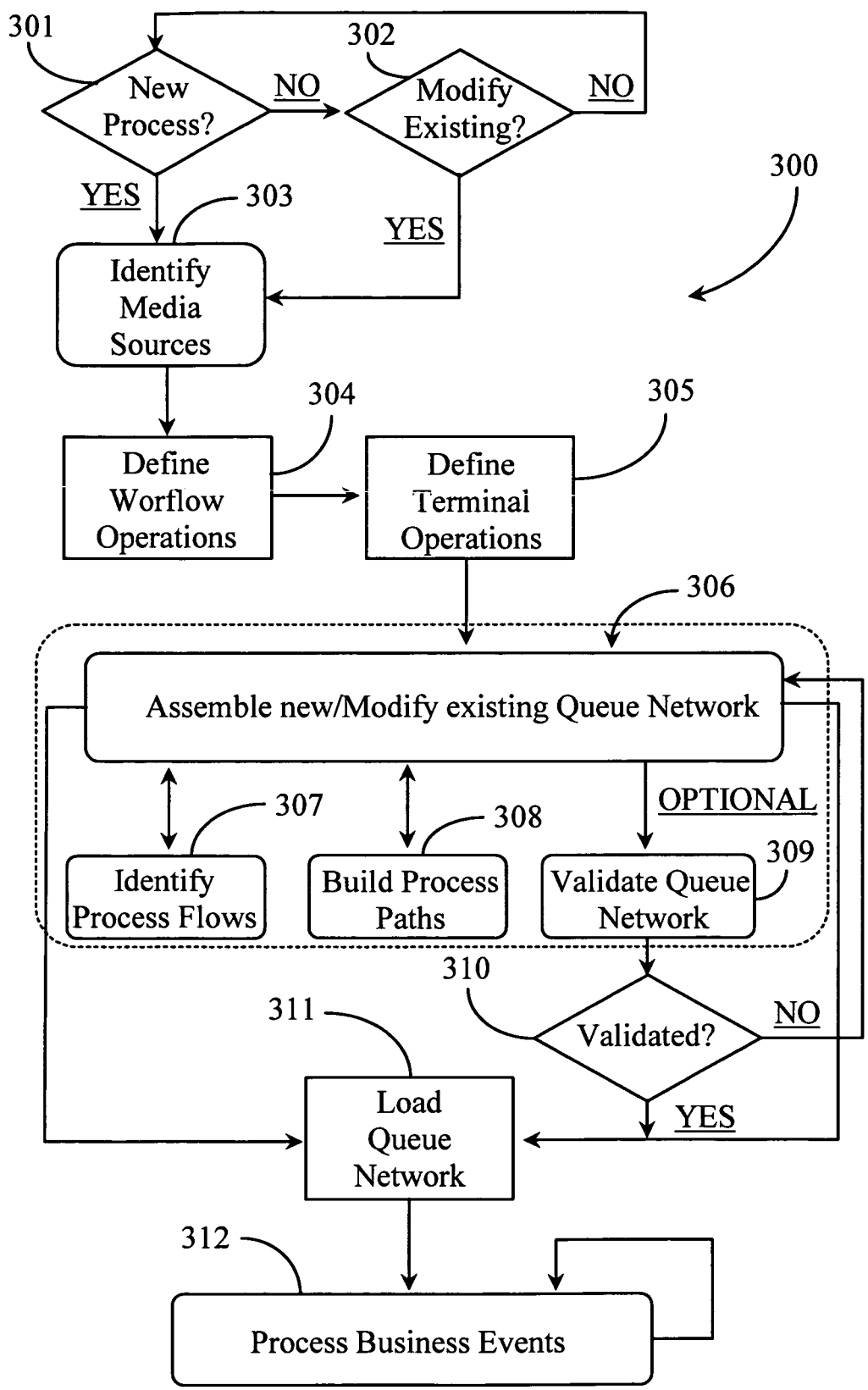
FIG. 3 is a process flow chart illustrating acts for creating and loading a queue network according to an embodiment of the present invention.

FIG. 3 is a process flow chart 300 illustrating acts for creating and loading a queue network according to an embodiment of the present invention. A queue network is created using an application user interface associated with an administration component analogous to administration component 128 of FIG. 1. The user GUI has object modeling and resource management capabilities and the capabilities of defining attributes of the objects and then assembling the network queue object together to form a fully functional queue network.

In act 301, a business process engineer or knowledge worker determines if a new enterprise process exists for which a queue network may be created. If no new process is required, the engineer may determine if an existing queue network already loaded may be modified to incorporate new functionality in act 302. If no at act 302, then the process loops back to act 301 until the engineer determines that a new process exists or some modification to an existing queue network is required in act 302.

In either case of yes in acts 301 or 302, at act 303 the administrator identifies media sources and system event types required for interaction and actual work item payloads. For example, if the process requires messaging, then those supported media types are identified. The system event type is initiated by conduit components described earlier. Work items might include but are not limited to voice calls, emails, notification events, web collaborative sessions, invoice requests, electronic forms, Radio Frequency Identifier Tag (RFID) events and so on.

At act 304, the engineer defines the workflow operations that need to be performed on the work items as they traverse the queue network. Mathematical operations, validation tasks, electronic signatures, automated response dialogs, and the like may be included depending on the results of act 303. At act 304 the engineer defines the terminal processing operations or actions required to terminate the processing of one or more work items. A terminal action may occur at virtually any point within the network of distributed queues. For example, a terminal action may be an operation that occurs at the end of the business process or may be the result of the generation of an erroneous condition or as the result of parallel processing that may occur within the business process. Terminal actions are conducted in association with the user integration components (UICs) described earlier. Any number of UICs may be deployed within a queue network and may cover a broad range of terminal, or "end" processing operations. Terminal operations may be automated or human assisted. Examples include but are not limited to handling of voice calls, email replies, Internet download initiation, rejection or approval notification generation and send, automated orders, credit card validations, account transaction and confirmations, and so on depending on the business process demands. Although not mandatory, a terminal operation generally results in the completion of the business process for one or more work items.

Once all of the above components are defined in acts 303 through 305, at act 306 the process engineer begins to assemble the queue network or the queue network segment of an existing queue network. In the latter case, an existing network may continue to run while the process engineer is assembling and deploying any modifications or new added segments. As part of broader act 306, a sub act 307 is undertaken by the process engineer to identify the process flow paths including application and memory resource locations for processing threads that act on queued work items.

At act 308, the process engineer builds the workflow paths that work items may take to advance from conduit to user components through a system. In this act, the engineer may identify basic queues, super queues, and all of the allowable couplings between all of the queues in the network. Basic queues and super queues may be thought of as elements that couple the conduit, workflow, and user components together to form the physical network. During this act, the process engineer may also determine other variables and static conditions like timeouts, queue threshold values, error conditions, and other processing conditions that may apply according to business rules.

After a queue network is built, an optional act 309 may be provided to validate the queue network in terms of valid architecture and functionality. This process may be conducted using a hardware or software simulator that takes sample work items through the possible paths and processes of the network. During this act, the process engineer has the opportunity to fine tune the network or fix any bugs before deployment. A completed queue network may be expressed in a variety of markup languages including but not limited to XML, JavaScript, or other machine readable language. Graphical representation in an object modeling sense can also be used to represent and communicate the constructed network or network segment. A queue network may be stored on a removable media like CD-ROM or Flash drive for convenient access and upload. The defined network or network segment may also be stored on a hard drive, in non-volatile random access memory (NVRAM), or in some other persistent storage for archiving and re-use. The constructed network definition may further be electronically propagated between nodes using lightweight markup and realized at destination by reassembling using the appropriate client administration component. There are many possibilities.

At act 310, it is determined before loading if the proposed queue network is valid. This act may only occur if optional act 309 is undertaken. In one embodiment, network queue validation described by acts 309 and 310 is a default process that may be automatically performed after the network queue is submitted for deployment. If at act 310 it is determined that the network queue or queue segment is not valid, then the process loops back to the broader act 306. In this case, the validation engine may generate one or more messages detailing what parts of the network queue definition need to be addressed in order to receive validation.

If the network queue is validated at act 310, then the queue network may be loaded onto the topology at act 311. This act may simply involve submitting the queue network to an existing communication broker on the target topology having a topology manager, a queue engine manager, and a deployment manager. In the case of a first deployment on a topology having no existing queue networks, first at least one communication broker is deployed and configured with the knowledge of the target topology such as number of nodes, CPU information, network path information, available bandwidth, and so on. It is possible that during deployment, a deployment manager may make one or more recommendations based on existing topology information that may not have been accounted for in design of the queue network. The deployment manager is capable of instigating the changes and any minor fixes required to the definition so that it will be fully functional with the modified distribution scheme.

In one embodiment the actual assignment of identifications, routing keys, and workflow and processing paths is left up to the deployment manager at the time of deployment. In that case, only the components, work item types, and enterprise rules need be provided to the deployment manager. The deployment manager may identify and build all of the work item paths and process paths according to its innate knowledge of the current state of the topology.

In one embodiment, queue validation is not performed and act 306, including sub acts 307 and 308 directly precede act 311 for loading the queue network. After a queue network has been successfully loaded, the system begins accepting generated work items and processing those work items at act 312. Act 312 is a continual act.

Figure 4:
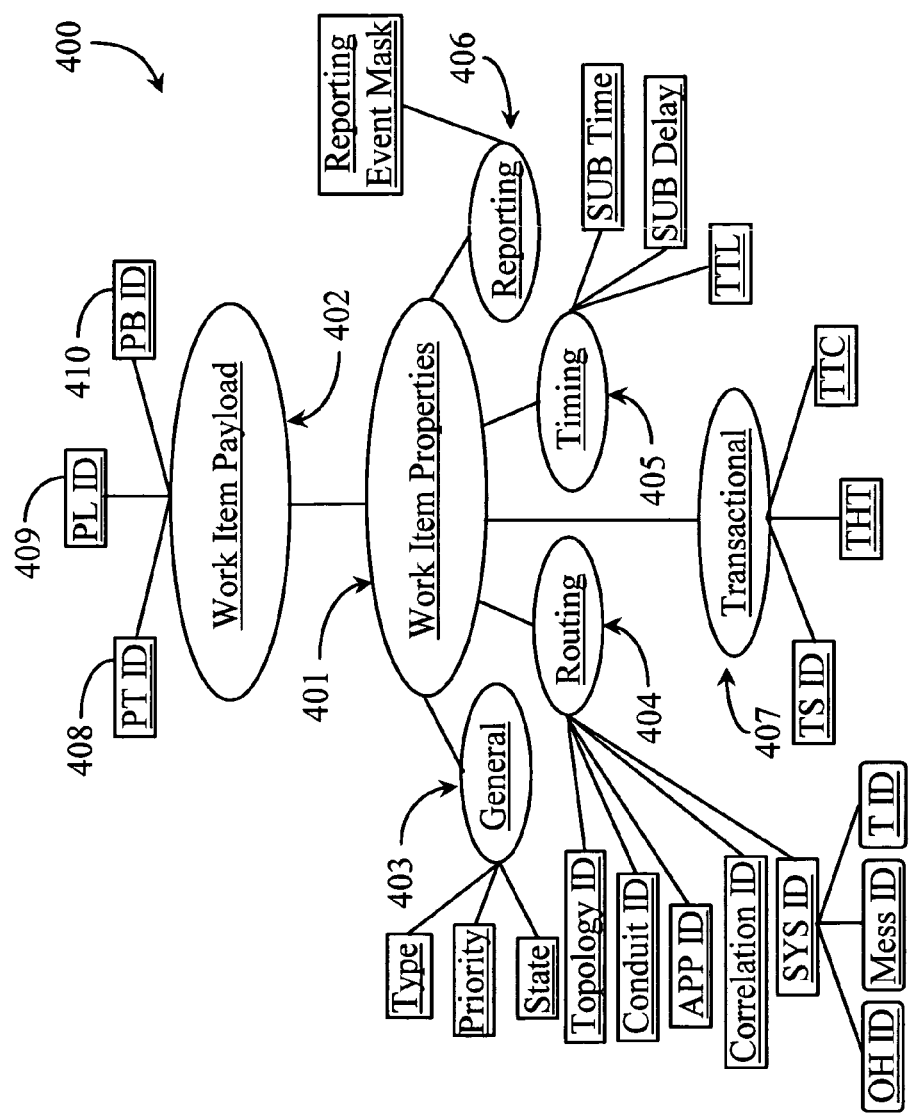
FIG. 4 is a block diagram illustrating a work item object and attributes according to an embodiment of the present invention.

FIG. 4 is a block diagram illustrating a work item object 400 and attributes according to an embodiment of the present invention. Object 400 represents the abstraction of a work item and possible attributes of the work item, which may or may not all apply depending on the type of work item modeled.

Work item 400 includes a work item properties object 401 and may also include a work item payload object 402. Payload 402 may be defined by the originating conduit and connected application charged with initiating work items into the system for processing. Payload 402 may or may not consist of one or more sequential bytes of unconstrained data of any type. Payload 402 of work item 400 is stored within a buffer defined by a payload buffer identifier 410. A work item payload may consist of XML, binary data, American standard code for information interchange (ASCII), or Unicode. In one embodiment, work item payload 402 may actually be a pointer to some externally stored information. Payload 402 may be an address pointer, a database row identifier, a specified file location, a data access key, or another reference mechanism enabling data access. Payload 402 also includes additional attributes besides just payload data. These attributes help to track the work item payload 402 according to an embodiment of the present invention and may also contain additional attributes in addition to the work item payload to help describe the length and type of the data that may have been associated with the work item 400.

One attribute of work item payload 402 is a payload type identifier (PT ID) 408. PT ID identifies one possible payload type out of many possible supported types. Another attribute of work item payload 402 is payload length identifier (PL ID) 409. PL ID 409 specifies the exact data length of the actual payload carried with or pointed to by the work item. Another attribute of work item payload 402 is a payload buffer identifier (PB ID) 410. PB ID 410 specifies which buffer, internal or external from the processing point the payload of the work item resides. If the payload is carried with the work item then the buffer location will be resident within the queue the work item is currently staged in. If work item payload 402 is a pointer to an external memory, then the location will be specified in the pointer description.

Work item properties 401 includes several objects, one of which is a general object 403 including the attributes of defining the type of work item, the priority of the work item relative to other work items known in the system, and the processing state of that work item, for example, complete, pending, or paused. Work item properties 401 include a routing object that includes all of the routing information known at the time of reference.

Routing object 404 includes the attribute topology identifier, which specifies the topology the work item is traversing. Routing object 404 also includes an attribute conduit identifier, which specifies the conduit responsible for originating the work item. Routing object 404 also includes an attribute application identifier (APP ID) that identifies the application that originally generated the work item. Another attribute of the routing object may be a correlation identifier, which provides indication of any correlation of the instant work item to any other work items that may be associated with it on a same business process or transactional sequence. Such work items may be processed in parallel on other paths so keeping track of the work item group is desired. Another attribute of routing object 404 may be a system identifier (SYS ID) identifying the queue network hosting the work item.

The system identifier includes three actual identification value attributes. These are an originating host ID (OH ID), a message identifier (Mess ID) and a tenant identifier (T ID). By applying these three identifier attributes to a work item, it is ensured that that work item is uniquely identifiable and sortable from other work items in the system and obfuscates any need for a central authority to provided identifier services.

Work item properties object 401 include transactional properties object 407. Transactional properties object 407 may include a transaction sequence identifier attribute that specifies an order of processing with respect to other correlated work items belonging to a same transaction. The transaction sequence identifier attribute may include a further sub-attribute for reporting the current state of the transaction sequence if it is an ordered sequence. For example, a work item may be one of three work items that are to be sequentially processed. It may be the third item to be processed. Perhaps state may indicate that it is being processed and the other items in the sequence are completed. The state attribute under general properties would simply indicate the item pending.

Transactional properties object 407 may include an attribute transaction handling type (THT) that specifies whether the transaction involves more than one work item and whether it is an ordered transaction following a sequence or a random transaction whereby there is no order in processing. In the later case, the transactional processing is complete only when all of the items are processed in no particular order. Transactional properties object 407 may include an attribute total transactional count (TTC) to indicate the total number of work items involved in a single logical transaction.

Work item properties object includes a timing object 405. Timing object 405 influences the life cycle of the associated work item with respect to when a work item may become active and or inactive, within a queue network. Timing object 405 includes an attribute time to live (TTL) indicating a specified time that the work item may exist before being processed. Timing object 405 may include an attribute delay submission (Delay SUB) that specifies a time to wait after a work item is submitted by a conduit before any action or process may begin on the item. Timing object 405 may include an attribute submission time (SUB Time) that specifies the time that the work item was first submitted if there is no Delay Sub time imposed, then processing may begin immediately.

Work item properties object 401 includes a reporting object 406 for specifying what events and state information shall be made accessible to other applications. Reporting object 406 has an attribute reporting mask that is a pre-defined filter specifying for the work item what information may be reported.

Abstract model 400 may be realized having more or less of the identified objects and attributes depending on the actual work items that it will model. However, all work items for processing will have some kind of payload and some set of work item properties so that it may successfully traverse the queue network with reliable and verifiable conclusion in processing.

Figure 5:
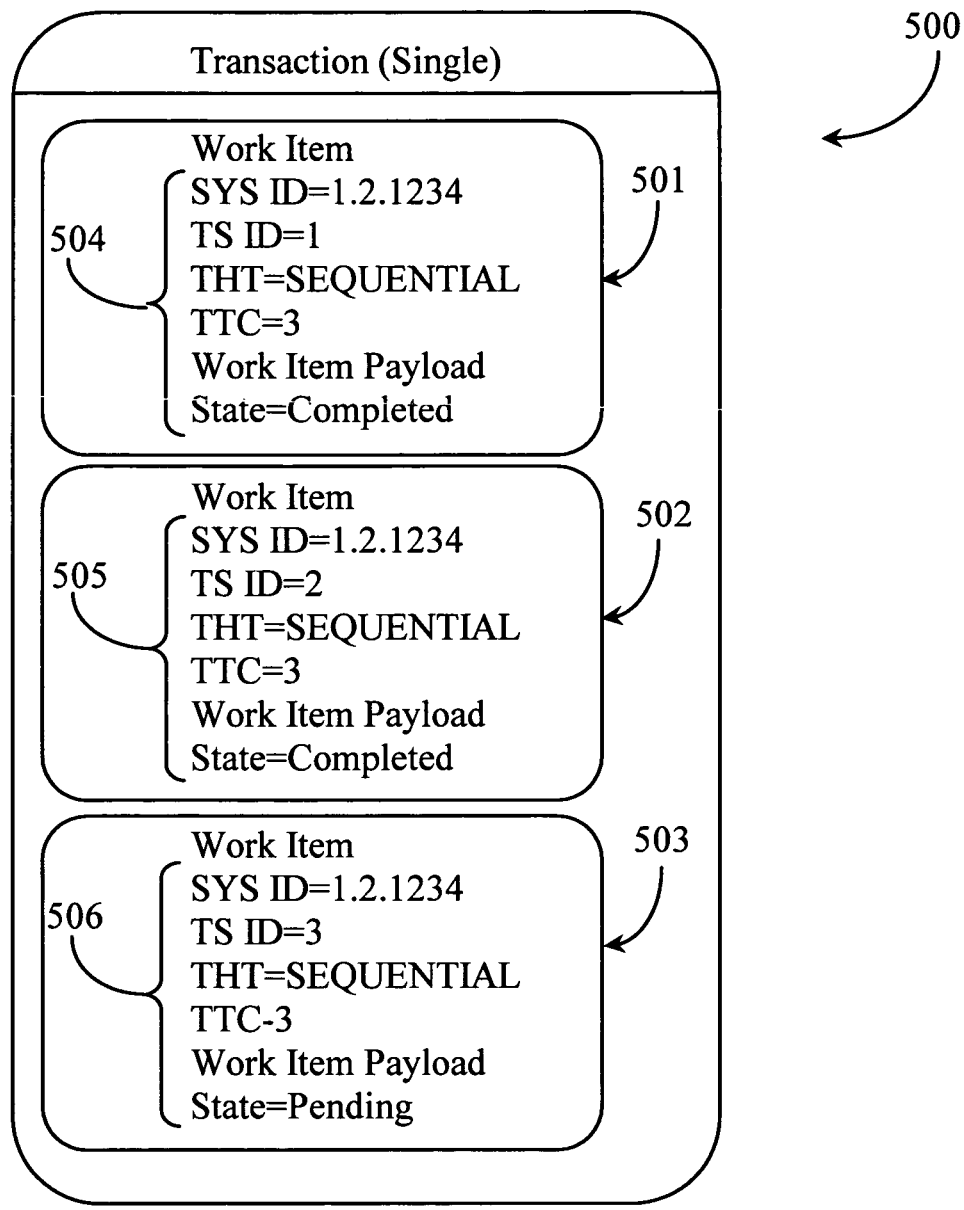
FIG. 5 is a block diagram illustrating a single work item transaction according to an embodiment of the present invention.

FIG. 5 is a block diagram illustrating a single work item transaction 500 according to an embodiment of the present invention. Work item 500 includes three related work items 501, 502, and 503, which must be processed to complete the transaction. Each work item has a set of reportable values 504 for work item 501, 505 for work item 502, and 506 for work item 503. Work item 501 has a system ID 1.2.1234 as do work items 502 and 503 identifying and associating the three work items together for the same transactional processing. For example, one work item might be a request from a customer, the next work item might be the customer's payment credentials, and the third work item might be the systems validation of the credentials enabling delivery of a product or service to the user. In this case, all three work items must be processed before anything can be delivered.

In this case, the work items have a transactional sequence identifier (TS ID). Item 501 must be processed first, then item 502 must be processed and then item 503 must be processed last. In this sequential order the items are labeled 1, 2, and 3 respectively.

In this case property sets 504-506 indicate that the transaction handling type is sequential. In this case there can be no random or out-of-order processing. Total transactional count (TTC) for transaction 500 is three work items. For each work item, the work item payload is present or pointed to by the work item payload attribute in each set of values 504-506. Also each set of properties indicates the current reported state of that work item in the transaction. Work items 501 and 502 are completed and work item 503 is pending.

A transaction like transaction 500 may consist of one or many work items depending on the complexity of the business process represented. For example, a loan approval process may require many more than three work items while an online music purchase may require just two work items.

Figure 6:
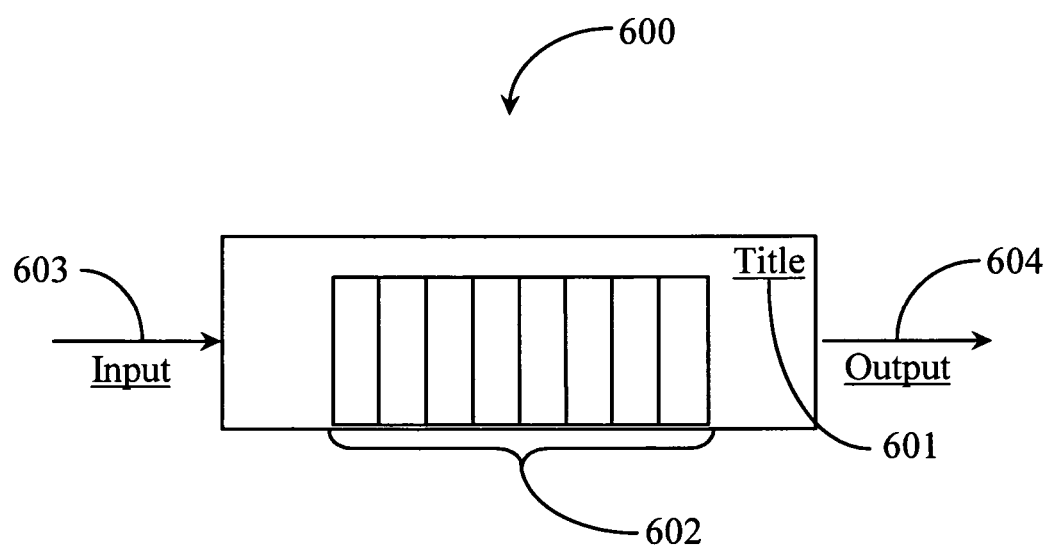
FIG. 6 is a block diagram illustrating basic structure of a queue.

FIG. 6 is a block diagram illustrating basic structure of a queue 600. Queue 600 may be used to form the basis of all other defined queues used in a queue network according to an embodiment of the present invention. Work item propagation through the queue network to fruition is accomplished through subscriptions made on queues. Queue 600 has a queue name or title 601. Queue 600 has a first-in-first-out (FIFO) queue structure 602 although this is not specifically required in order to practice the present invention. In another embodiment the structure may entertain priority assignment or it may be a virtual queue. Queue 600 accepts work items queued therein through a queue input 603. Work items are de-queued through a queue output 604.

In a preferred aspect of the invention queues may be coupled together such that the output of one or more queues in a queue network is associated with the input of one or more queues in the network. The process of associating queues in this manner may be referred to herein as subscribing. A queue subscription may be defined simply by placing it on a queue from another queue using the name of the queue as the subscription target. Subscriptions may further specify the work item types included in the subscription. The ability to form subscriptions renders it possible to chain multiple queues together thus forming a queue network. There are 2 ways that a work item may enter a queue. One is that it is generated by an application and enters a conduit, and the other is through subscription to the queue the work item was previously queued in. Building on the concept of a simple queue structure, more elaborate queues are provided and are described below.

Figure 7:
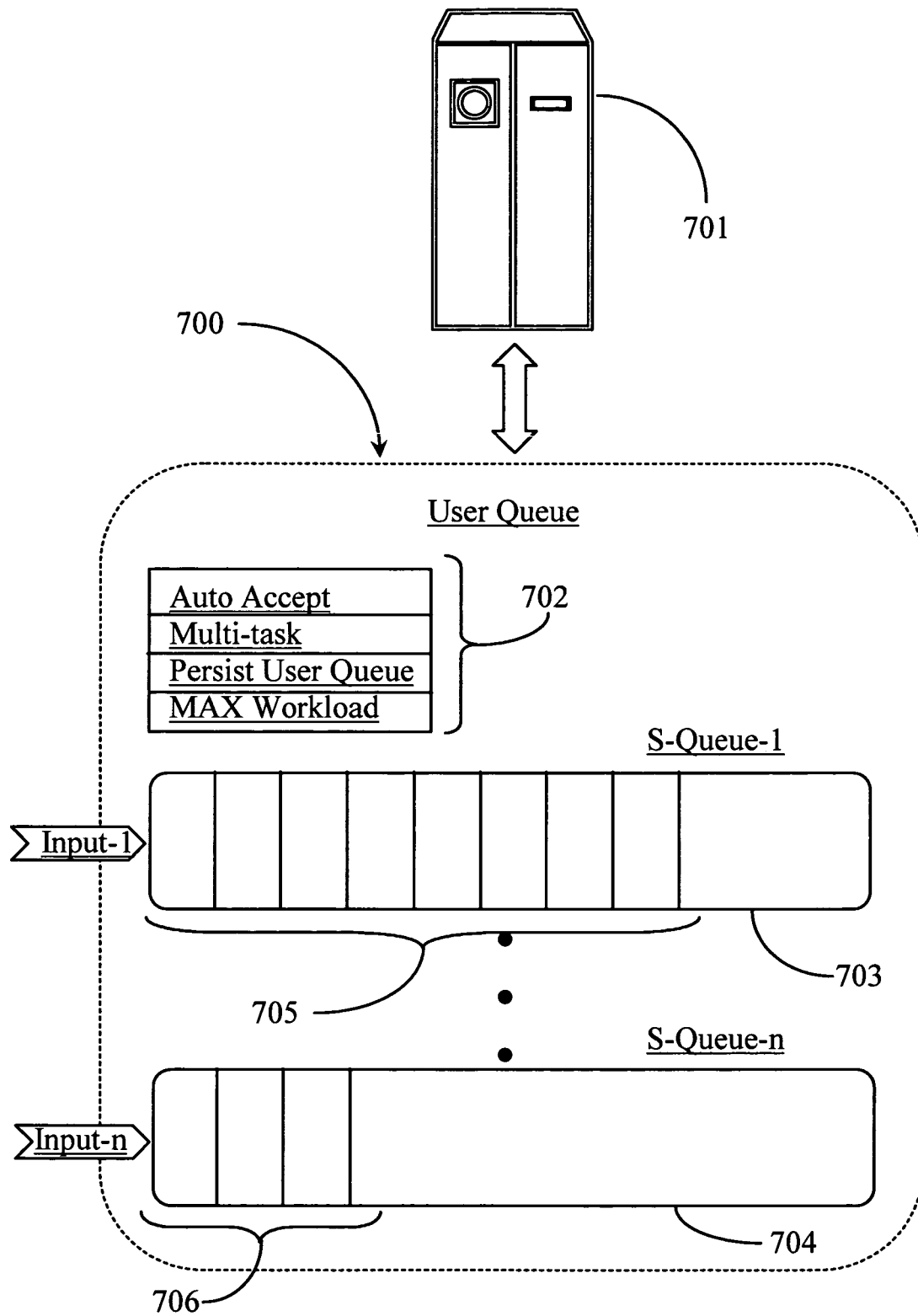
FIG. 7 is a block diagram illustrating a user queue according to an embodiment of the present invention.

FIG. 7 is a block diagram illustrating a user queue 700 according to an embodiment of the present invention. User queue 700 is analogous to user integration components 124-127 of FIG. 1. User queue 700 may be interacted with by one or more external applications illustrated herein by a server 701 having bi-directional communication with queue 700. Application program interfaces (API) to other applications enable automated queue processing by those applications. Likewise, one or more human operators or agents may interact with queue 700, handling and concluding the work items queued therein.

User queue 700 is a terminal processing point as described earlier meaning that it is an end queue for work items that once processed signify the satisfaction of the business process or transaction being realized. Therefore, no other queue would likely place a subscription on a user queue.

User queue 700 receives work items for processing in this example by subscribing to certain other queues within the topology of the queue network. This is not specifically required in order to practice the present invention. For example, there may only be one user queue on a network whereby all work items end up in the queue for terminal processing. In this example, there are 2 subscriber queues (S-Queues) illustrated. These are S-Queue-1 (703) and S-Queue-n (704). It will be apparent to one with skill in the art that there may be many more than 2 S-Queues within user queue 700. Moreover one S-Queue may be a subscription to more than one other queue such that the work items leaving those queues enter a single subscription queue that aggregates the items for terminal processing at one point. Still further, a subscription to a queue may include an attribute for filtering the types of work items that are subscribed to. For example, a multimedia queue may contain work items that are disparate from one another such as emails and voice calls. A user queue may subscribe to only the voice calls from the multimedia queue and not the emails.

User queue 703 has 11 total work items queued for processing. Subscription queue 703 (S-queue-1) has 8 items (705) for processing. Subscription queue 704 (S-queue-n) has only 3 work items (706) queued for processing. There may be a maximum workload limit value (properties 702) for queue 700. A maximum limit simply means that the user queue can have no more than X total work items queued. The value of a maximum limit of work items queued in each S-queue may vary from S-queue to S-queue within queue 700, or there may not be a set limit depending on enterprise rule. However the total number of work items that can be handled is the maximum workload (MAX workload) of queue 700 (properties 702). Therefore, the total of all of the S-queue limits should not exceed MAX Workload for queue 700.

The way queue coupling works according to an embodiment of the present invention is that work items from intermediary queues that user queue 700 subscribes to are output from those queues once processing at those queues is complete into the inputs of queue-1 through queue-n of user queue 700 automatically according to the workflow influenced, of course by the subscriptions. Subscriptions may be permanent or temporary and may be initiated and cancelled during run time. For example, if user queue 700 for some reason can no longer take work items from some or all of its subscribed queues, then those subscriptions may be canceled, handed off to another user queue, or may be traded for subscriptions of another user queue during run time. A subscription to another queue by user queue 700 may be temporary or permanent and may be set up during run time and torn down during run time as long as another terminal processing point is available to handle the remaining unprocessed work items of a transaction.

Properties 702 of user queue 700 includes a multi-task parameter that dictates whether an external application or human operator may operate on more than on work item at a time with regard to work items queued in S-queue-1 through S-queue-n if The parameter is set to true, for example, then application 701 may process multiple work items simultaneously. If the parameter is set to false, then only one work item may be handled at a time.

Properties 702 include an auto accept parameter that may also limit the number of work items that may be queued within queue 700. If auto accept is set to true, then queue 700 may accept all work items up to the limits imposed on the internal subscribed queues if any. If auto accept is set to false, then queue 700 may only be controlled from external application 701. Application 701 may be an automated response system or a human interface. Therefore, regardless of workload currently queued, queue 700 may only be able to accept a next work item according to a directive or notification sent by the external application that it is ready to accept a next item. The external application may also refuse pending work items for any of the internal queues.

Properties 702 include a persist user queue parameter that may be set on to maintain the state of queued work items across multiple sessions by the external application. This is particularly useful if the external application is a human interface and transaction completion is a rounded process. A call center agent application might be a good example of an external application that would require maintenance of work item state over multiple sessions.

Figure 8:
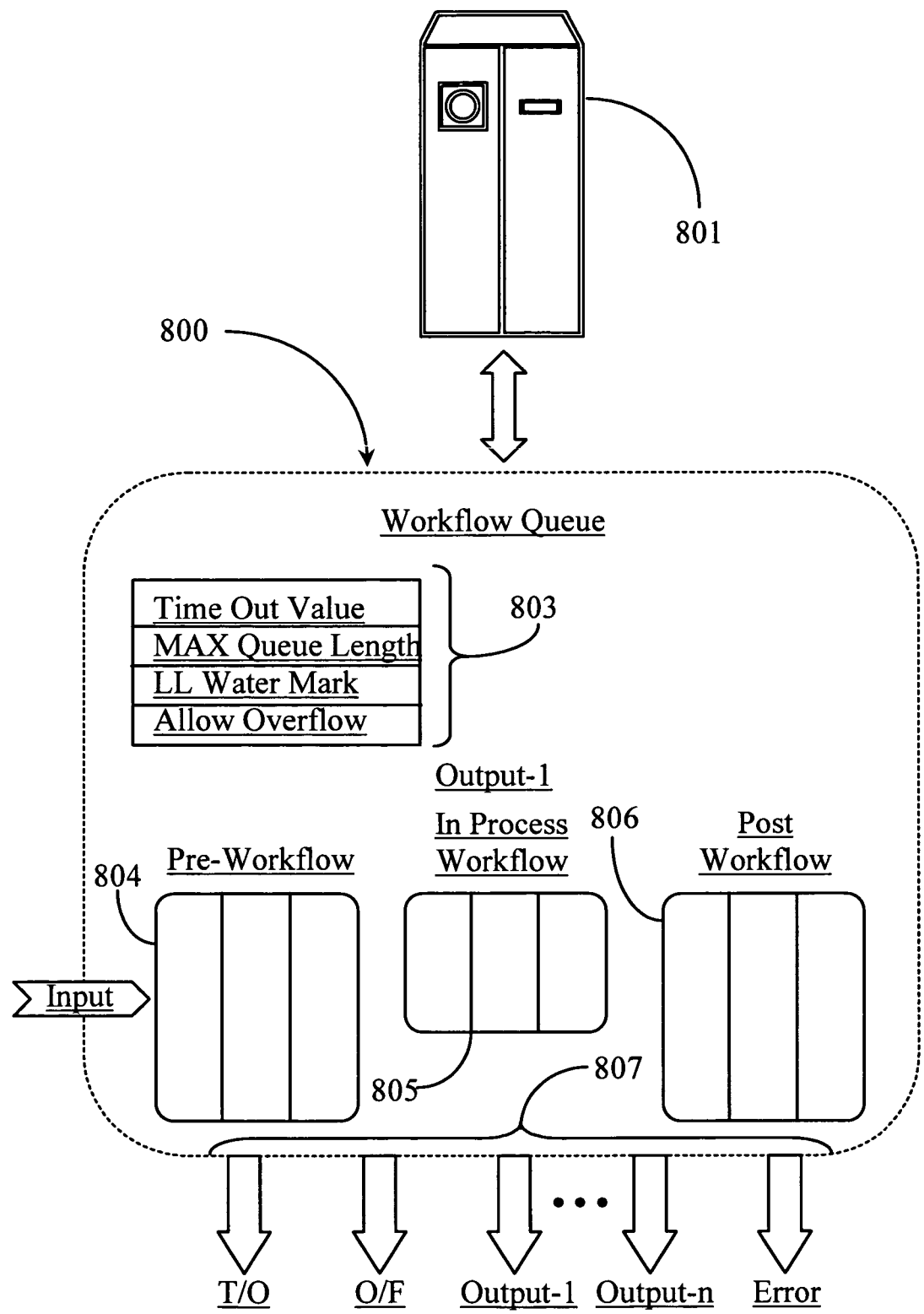
FIG. 8 is a block diagram illustrating a workflow queue according to an embodiment of the present invention.

FIG. 8 is a block diagram illustrating a workflow queue 800 according to an embodiment of the present invention. Workflow queue 800 is analogous to workflow integration components 120-123 of FIG. 1. A workflow queue is an intermediary processing or decision point in the overall workflow of one or more work items traversing through a queue network. Workflow queue 800 may be subscribed to by other queues and may have subscriptions to other queues. Like user queue 700, an external application represented herein by server 801 may interface with workflow queue 800 and may process work items queued within. Application 801 may be an automated response application or a human agent or operator as previously described above for application 701 of FIG. 7.

Workflow queue 800 has a queue input and pre-workflow queue 804. Work items within queue 804 are in a state of pre-process or waiting to be processed. Queue 800 has workflow queue 805 for work items that are in a state of process or are currently being processed. Queue 800 has a post queue 806 for work items that have completed processing and are staged or scheduled for de-queuing. In this example, each section may hold 3 work items. Queue 800 may hold 9 work items at any one time. This number is only exemplary and is used for simple illustration only. It will be apparent that a queue may be designed to host any number of work items depending on memory space and other factors.

Workflow queue 800 has a set of properties or parameters 803. A time out value may be imposed on any one or all of internal queues 804, 805, and 806. One output (807) of queue 800 may be a time out notification output for any work items that time out before being completely processed. A work item may time out in queue 804, or in queue 805. A time out value may specify a specific TTL for any work items remaining in queue 804. Therefore, if a work item cannot be advanced to queue 805 within a specified window, the item may be rejected, deleted, or moved to another queue adapted for the purpose of processing delayed work items.

A work item may time out within workflow queue 805 if the processing being performed on a work item is slower than what might be acceptable, or it is late to connect and process any of the work items. A work item may also time out even though it is completed in terms of processing if it is queued for de-queue for more than a specified period of time. In this case, the work item may potentially be revived if a subscribing queue still wishes to process the item.

Properties 803 include a maximum queue length that includes the weight of all of the internal queues within queue 800. Each internal queue may also have a low level (LL) watermark serving as an indicator that the particular queue is hungry for more work items. Properties 803 may also include a parameter allow overflow. When this parameter is set to true work items may be moved into another queue or diverted into another queue that subscribes only to overflow.

Queue 800 has several outputs 807. One output 807 from queue 800 may be an error output for notification of an error during processing and for moving the erred work items falling under that category to another queue. Outputs 807 of queue 800 may include an overflow (O/F) output that comes into play when any of the internal queues 804, 805, or 806 the queue begins reach maximum queue state. O/F may overflow into a secondary backup or shadow queue, or another subscriber queue adapted to handle overflow. Outputs 807 include outputs-1 through output-n for de-queuing work items to subscribing queues after processing has been completed. Subscribing queues may be other workflow queues or user queues within the network topology.

Figure 9:
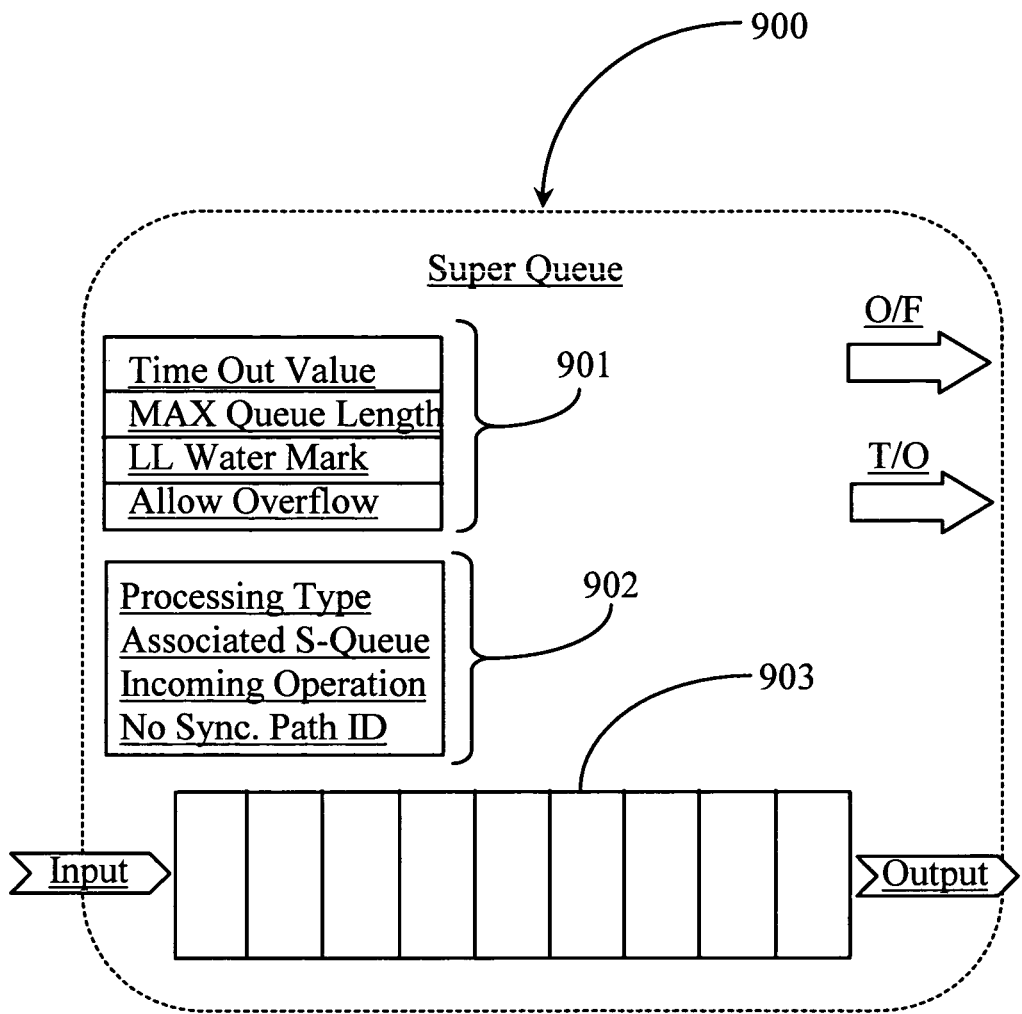
FIG. 9 is a block diagram illustrating a super queue according to an embodiment of the present invention.

FIG. 9 is a block diagram illustrating a super queue 900 according to an embodiment of the present invention. In one aspect of the present invention super queue 900 is provided as an enhanced version of a basic queue. Queue 900 may be used to connect other queues together and to insert enhanced workflow semantics into a queue network such as parallel processing. One skilled in the art of workflow design may appreciate that workflow semantics may include but are not limited to parallel processing, synchronization of parallel work items, prioritization based upon specific system criteria. System criteria may include but is not limited to shortest subscriber queue and longest available subscriber queue.

Queue 900 has a set of properties 901 that are analogous to properties 803 of FIG. 8. Queue 900 has an additional set of properties 902 that enable enhanced operations. Queue 900 is an intermediary queue like a workflow queue and not a terminal processing point like a user queue. Properties 902 include identification of processing type. A processing type value or values will identify the type or types of processes that will be performed on outbound work items illustrated herein as work items 903. Processes may include a Parallel Split with no merge. A parallel split provides a broadcast capability allowing work items to be replicated to all subscribers to super queue 900. Possible processes may include a parallel split with a synchronized merge. A parallel split with a synchronized merge allows a work item to be replicated across all subscribers of super queue 900 and enables the work items to be synchronized later within the queue network.

Another possible process type includes an exclusive output based on a specific algorithm. This process allows a target subscriber queue of a specific work item to be determined based upon various algorithms used to identify a suitable subscriber queue according to some predetermined criteria or rule. Examples of possible criteria may include queue length, average processing time, and the like.

Another property 902 is identification of one or more associated super queues that may be utilized to perform parallel processing of work items including performing workflow splits and merges at later points or junctions within the actual workflow of the items. Yet another property 902 is identification of one or more incoming operations. This value may defines a type of processing operation that may be performed on work items that are received in queue 900 and that may have originated from another super queue within the same queue network as a result of the previous super queue performing a parallel split with or with out a synchronized merge. Therefore the current super queue may have access to the workflow history of the items.

Properties 902 also include a parameter No synchronization (Sync) path ID. This parameter may be used as a variable to perform a merge operation based on a path ID that is associated with a previous super queue output. Similar to a workflow queue, super queue 900 may support a timeout, and overflow subscriptions to other queues. Like the workflow queue, the determination of whether a work item should be routed to a time out subscriber queue or that of an overflow subscriber flow may be determined by the values provided within the parameter. By creating and distributing one or more super queues within the queue network processing boundary resources can be fully utilized and overall queue network throughput may be expanded. Super queues can be provided to turn on and off when needed. For example, during peak processing hours one or more super queues may be activated to speed processing by working as parallel processors each performing different operations on a replicated work item. An auto-populated electronic form for example, may have 4 sections to populate with data. Using super queues, a process engineer may set up replication of the form to 4 parallel processors (super queues) and then may set up a merge of the replicated work items back into one fully populated form whereby each queue performed a different process during the split and merge sequence.

Figure 10:
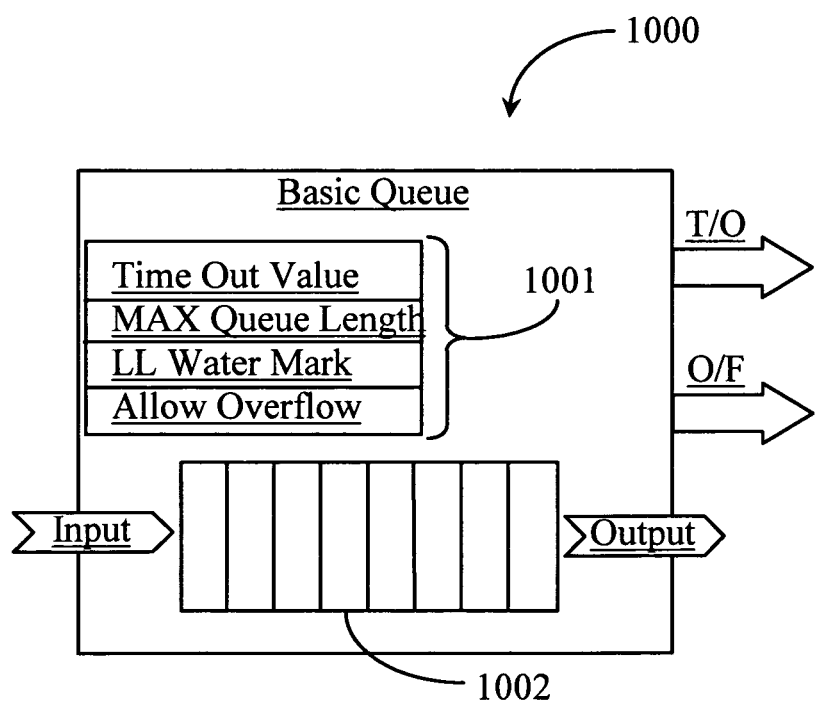
FIG. 10 is a block diagram illustrating a basic queue according to an embodiment of the present invention.

FIG. 10 is a block diagram illustrating a basic queue 1000 according to an embodiment of the present invention. A basic queue may be thought of as another form of workflow queue having the same properties 1001 of time out value MAX queue length, low level water mark, and overflow allowance. A basic FIFO or prioritized queue structure 1002 is illustrated having an input and an output. Basic queue 1000 may subscribe to other queues and other queues may subscribe to basic queue 1000. Outputs to other queues may include a time out T/O and an overflow O/F. Basic queues may be inserted into a queue network along any defined workflow path to propagate the work items on to queues that will enable processing of those work items. It is noted herein that queue 1000 is not coupled to any external applications.

Figure 11:
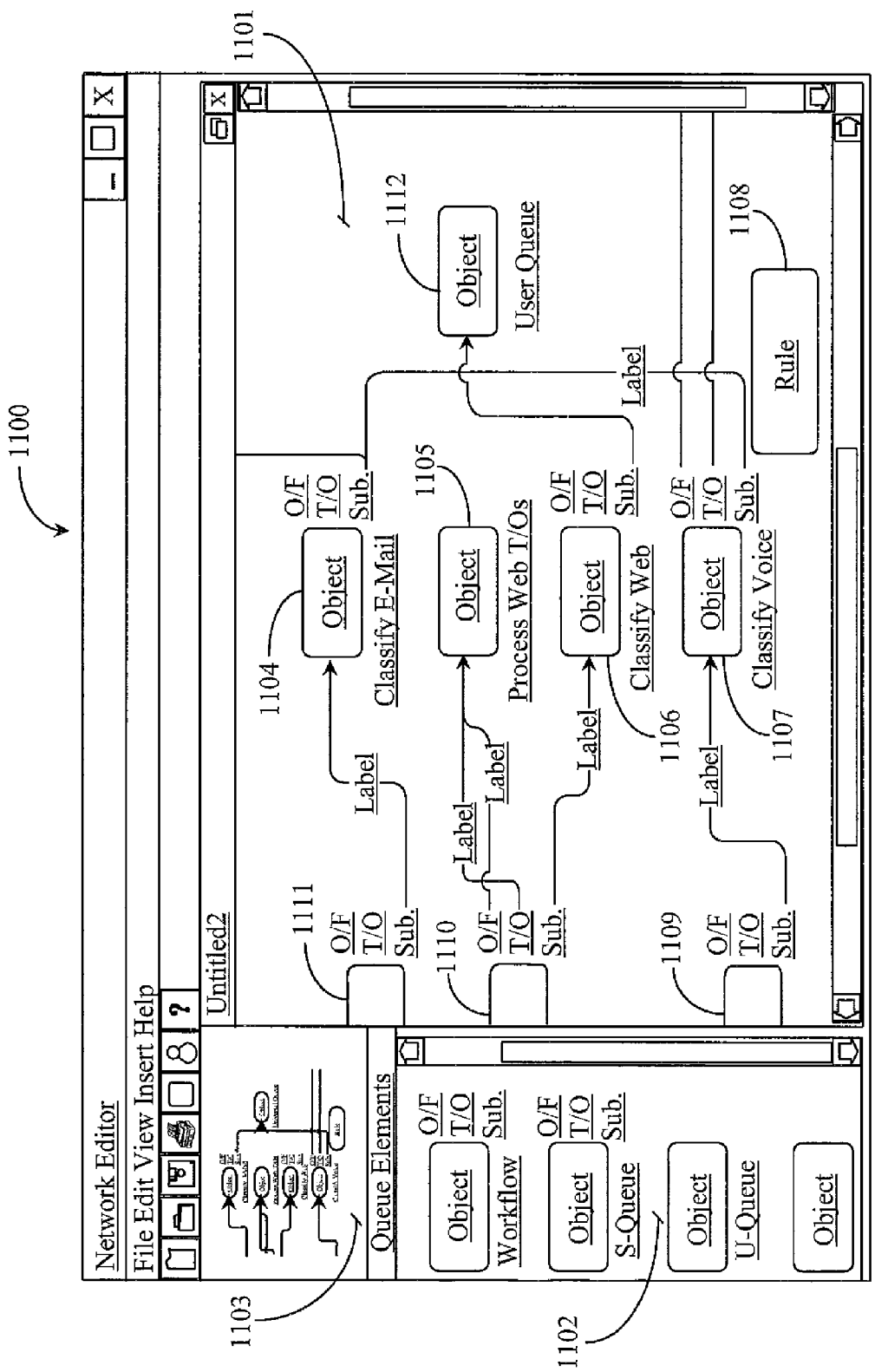
FIG. 11 is an exemplary screen shot of a graphical user interface for building a queue network according to embodiments of the invention.

FIG. 11 is an exemplary screen shot of a graphical user interface 1100 for building a queue network according to embodiments of the invention. Interface 1100 may be used to model the relationships between elements of a queue network. The tool enables a process engineer to define and build queue subscriptions and to include any other parameters associated with individual queues in the network. Interface 1100 may also be used to load a defined queue network that may or may not have been created using the tool. For example, interface 1100 may upload a defined network from a storage device, for example, and represent it graphically for a user and enable that user to load it or modify and load it onto a topology of communications brokers. A process engineer may also leverage interface 1100 to upload a representation or snapshot of queue networks that are already loaded on a topology through the reporting and administration integrations described earlier in this specification.

Interface 1100 is labeled Network Editor in this embodiment and may be hosted on a personal computing device having access to the network topology or in a network connected server and accessible to a user. Interface 1100 is browser based in this example. It may be provided as a server-based application, or as a browser client application to authorized users. Interface 1100 has a pull-down menu bar typical of browser-based interfaces including a set of functional icons located in the upper left tool bar area under the pull-down menu titles. Other icons not visible here such as stop, refresh, back and forward buttons may be assumed present in this example. Other features not directly related to queue network design may also be provided like standard Google™ search options and the like.

Interface 1100 has a workspace window 1101 wherein a user may view an abstract relational diagram of a queue network including workflow paths queue objects and external application paths for processing. Queue objects visible within workspace window 1101 include objects 1104, 1105, 1106, 1107, 1109, 1110, 1111, and 1112. Queue objects 1111, 1110, and 1109 may be conduit queue objects. Queue objects 1104, 1106, and 1107 may be workflow queue objects. Queue object 1112 is a user queue in this example. Queue object 1105 is a queue for processing time outs and overflows. Because Object 1105 has a time out connection and an overflow connection, both conditions may be treated equally with respect to the queue network. Place label fields are provided in this example for a process engineer to label workflow and external application paths.

Workplace window 1101 is horizontally and vertically scrollable using standard scrollbar features. Objects 1104 through 112 may be provided in basic abstract form in an object palette 1102 provided with the user GUI supporting interface 1100. Palette 1102 may contain basic building block elements of the queue network including queue objects, input and output objects, link objects, and so on. In this way, objects may be dragged from the pallet and dropped into workplace window 1101 using object linking and embedding (OLE) or some other object modeling assembly protocol. The objects may then be assembled or coupled together link objects like subscription links, output links, overflow links, timeout links, and so on.

A rule object 1108, which may also include conditions, is provided in an abstract form to enable a process engineer or other qualified knowledge worker to program any rules and condition that apply to objects. All of the data associated with components of the present invention may be provided through a programming interface per object and linked to the object as the objects attributes and functional constraints. A variety of object modeling languages that support graphic representation such as unified modeling language (UML) or can be used to describe the queue network to complete attributes and functionality of the network and the components of the network. Java Script, extensible markup language, and others may be used to provide machine-readable process function in automation. There are other model representation and transformation languages available to the inventor.

Interface 1101 view window 1103 provided to the upper left of workspace window 1101 in this example. View window 1103 enables the user to view portions of or all of a queue network during and after assembly. Different magnifications may be provided so that the user may view different snapshots of the network to aid in navigating. A user-operating interface 1100 may build a new queue network, fix an existing queue network, and assemble two or more queue networks together to scale up from a smaller network. A user operating interface 1100 may copy and past or replicate functions segments of a network queue that may need to be duplicated at least before naming conventions and addressing is completed. Finished components are reusable and portable and can be duplicated any number of times where they may be needed in a given network topology.

One with skill in the art of object modeling transformation and deployment tools will appreciate that interface 1100 may be just one interface screen of many interactive screens accessible through the administration integration application. There may be a separate interface for testing a queue network, queue network segment, or a queue network component after it is built and enabled. Another interface screen may be dedicated to queue network deployment, while another interface screen may be dedicated to queue network maintenance and ongoing administration. There are many possibilities.

Figure 12:
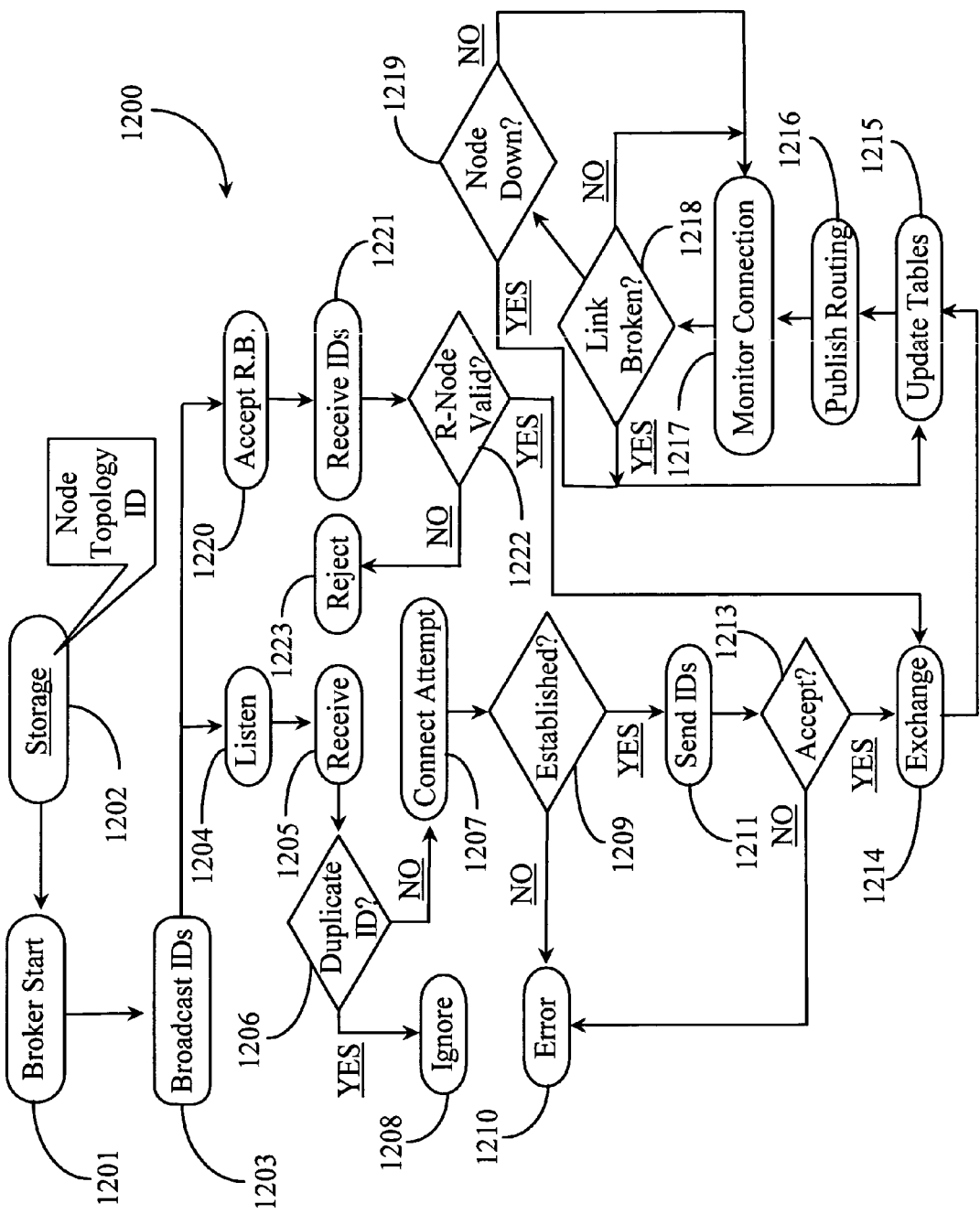
FIG. 12 is a process flow chart illustrating acts for converging two or more communications brokers to form a single processing entity according to an embodiment of the present invention.

FIG. 12 is a process flow chart illustrating acts 1200 for converging two or more communications brokers to form a single processing entity according to an embodiment of the present invention. At act 1201 a communications broker is executed and begins initializing. This may be accomplished remotely or by schedule. In this act, the broker may receive its node topology identifier from a local storage on the processing boundary hosting the broker at act 1202.

At act 1203, the broker broadcasts its identification over the network. In this act additional information such as but not limited to the processing environments host name, IP address, or other protocol routing and connection information required like a port number may also be broadcast. This may allow other broker instances to attempt communication with the initialized broker's remote service manager component described earlier.

The broadcast message may, in other embodiments include status information indicating any current applicable status such as initial start up time expressed in universal coordinated time as well as a process environment identifier commonly referred to as a process identifier. The broker's topology manager also described in FIG. 2 may actually perform the broadcast act. The broadcasts may be periodically performed while the broker is executing. At act 1204, the broker simultaneously with act 1203 begins listening for broadcasts from other brokers on the network. Act 1204 may be a continual operation and may be undertaken by the broker's topology manager component.

At act 1205, the initialized broker receives a broadcast from another broker. This act may be an ongoing act until all valid broadcasts have been received. At act 1206, the broker may determine whether the broker identification received at act 1205 is a valid one or a duplicate identification. The act of validating the broadcast message may ensure that the remote node that sent the broadcast is using a node identifier that is not already known to the system. If the broadcast information represents a node that may already be known to the initialized broker then the broadcast may be ignored in act 1208 and no additional action is required, as this broker already knows the node.

With regard to act 1206, if the received broadcast ID information matches on node identifier and host information but the process identifier is different, then it may be assumed that the remote node has been restarted. In this case a connection attempt is made to the node in act 1207. If only the node Identifier is known to the receiving broker then this may signify that the remote broker has an incorrectly configured node identification. In this case the broadcast message is also ignored in act 1208. All broadcast messages that are received that do not have the same topology identifier as that of the executed node of act 1201 are also ignored at act 1208 because those nodes reside in a different topology and cross-topology broker connections may not be desired though they are certainly possible to establish and maintain. If in act 1206 the broker determines that the identification is valid and not a duplicate identification, then at act 1207 a connection attempt is made to the broker of the received broadcast. In act 1209 it is determined whether or not a connection has been established between the brokers. If not, an error message may be sent to the broker attempting to establish connection. Reasons for a failed connection may include but are not limited to "host not reachable", "invalid host name", or "communication timeout".

In one embodiment there may be more than one attempt made at act 1207, however, in another embodiment no further attempts will be made to establish a connection with the remote node. As long as all of the broker nodes periodically broadcast their location, identification and state, another connection attempt to the same broker subject of the failed attempt in act 1207 may eventually be retried as a normal part of the process.

If at act 1209 a connection has been established, then the broker sends its identification in act 1211 to the remote broker it received the broadcast from in act 1205. This information is the same as the broadcast information, but instead of a broadcast it is sent directly across the established link. At act 1213, the initialized broker validates whether or not it has been accepted. If at act 1213, the remote broker because of invalid ID has not accepted the local broker then an error notification may be returned to the local broker at act 1210 and the process ends. The initialized broker cannot accept any client connections. If at act 1213 the identification is accepted, then at act 1214 the connected brokers exchange routing information. This loop serves as a successful detection scheme for duplicate broker topology identifiers. If at act 1213, the local broker has been accepted, then at act 1214, the local broker exchanges routing information with the remote broker.

At act 1215, each broker updates its routing table and publishes the table on the topology in act 1216. Now that the connection has been established and validated, it is monitored at act 1217 for activity. Each broker serving as an endpoint for the established link performs monitoring at act 1217. Monitoring may be limited to link health such as whether the link is currently active or not. At act 1218 if it is determined at any time that the connection has been broken, then the affected brokers each update their tables again in act 1216 and publish the new routing tables at act 1216. This loop repeats every time a link is broken or temporarily unavailable. If the link is currently active at act 1218 the process loops back to act 1217 for monitoring.

Acts 1204 through 1215 complete one main thread of execution by the local broker initialized at act 1201. As described above, a monitoring loop exists in the process. In one embodiment, a message may accompany the results of monitoring. For example, if monitoring at act 1217 detects a broken link at act 1213, then it may be reported why the link is down if known. Therefore, at act 1219 a determination of cause of the broken connection is made. At act 1219 it is determined whether a node critical to the connection is down. If not monitoring continues to determine if the situation might only be temporary. If one of the nodes is down, then the remaining node updates its routing table and publishes its new routing information reflecting the down link. The down node cannot update its tables and its tables will not be published while it is down. When it is brought back up it will receive the new routing information.

While the broker is broadcasting at act 1203 and listening for broadcasts at act 1204, it is also listening and accepting remote broker connection requests at act 1220. In this case, the interaction may be that of a remote node responding to a broadcast made by the local broker of act 1201. Therefore, after accepting the connection, the local broker receives the identification from the remote broker at act 1221. At act 1222, the local broker determines if the remote broker has a valid ID. If it is not valid at act 1222, then the local broker rejects the remote broker connection in act 1223. If at act 1222, the local broker determines that the remote node is valid, then the process resolves back to act 1214 wherein routing information is exchanged. Acts 1215, 1216, 1217 and associated determinations and resulting actions 1218 and 1219 are repeated. The entire process is asynchronous and is complete when all existing nodes are active and functioning properly within a topology. At this point the process is idle with only monitoring functions active until a new node is started or one goes down. A node may go down because of failure or because it is taken down gracefully.

Each broker node on a topology maintains and publishes its own routing tables so similar to a telephony network so an administrator may access any communications broker to determine updated network routing conditions for all of the nodes on a topology. In one embodiment, an administrator may make a modification to any communications broker such that the specific modification made may cause the broker to reingratiate launching the convergence process again. An example of such a modification might be updating the protocol handler with new protocols to communicate with brokers on another physical network that is bridged to the host network. In this respect, act 1214 may include propagation of updates among all of the connected brokers.

One with skill in the art will appreciate that process 1200 may include fewer acts or more acts without departing from the spirit and scope of the present invention. For example, act 1219 may not be required. The fact that a connection is broken may be sufficient information for table updating and publishing the new tables. Likewise, node validation as described in act 1206 may not specifically be required in order to practice the in process of convergence if the topology is strictly controlled by a single administrator and broker IDs are tracked within the administrators interface. As long as duplicate IDs are never assigned all nodes should be valid in that regard. In one embodiment, an administrator using the administration integration interface running a simulation may validate broker configuration with respect to other known broker configurations on the network before actually deploying them.

Figure 13:
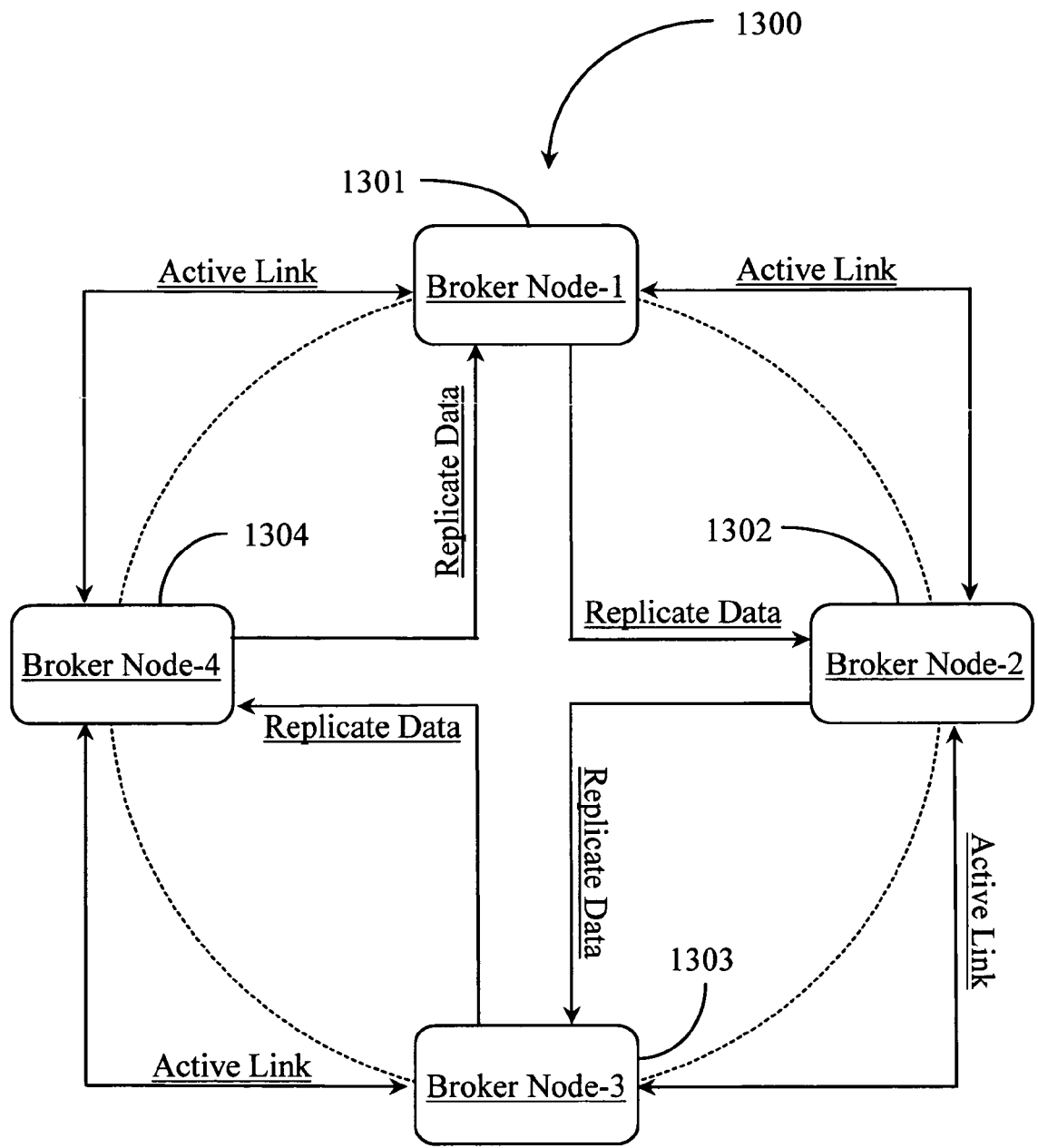
FIG. 13 is a block diagram illustrating broker replication architecture according to an embodiment of the present invention.

FIG. 13 is a block diagram illustrating broker replication architecture 1300 according to an embodiment of the present invention. In a preferred embodiment, architecture 1300 includes high availability paring of broker nodes deployed on a topology. High availability paring of communications brokers ensures that if one broker is unavailable then a backup may assume processing and communication responsibilities of the failed node. This is accomplished by configuring specific brokers as backup nodes for other brokers and by replicating data to the backup nodes.

In this example, architecture or topology 1300 includes 4 distributed communications brokers. These are broker node 1301 (broker node-1), broker node 1302 (broker node-2), broker node 1303 (broker node 3), and broker node 1304 (broker node-4). A backup configuration exists in topology 1300 that takes on a circular scheme in a preferred embodiment. This is to attempt to ensure that no two-broker nodes on a topology are backup nodes for one another (referred to as cyclic).

The remote services manager (not illustrated) within each broker instance handles high availability paring within the topology and any remote services manager may trigger a reassignment of high availability parings due to any changes in the state of broker community such as when a node fails. The remote services manager in any broker node has information indicating which broker node in the topology is its peer node that subscribes to data replication from that node. It is the indicated node that is the backup node.

Broker 1301 has an active link to broker node 1302. Broker node 1302 is a backup node to broker node 1301. Node 1301 replicates its data to node 1302. Because brokers manage all communication between components and queue elements, each broker has data relevant to all of the work items and processes being performed on associated queue network segments that it is responsible for. So replicated data from broker 1301 to broker 1302 includes all of the activity information in progress on the queue network segment that broker 1301 directly manages.

Broker node 1302 has all of the currently active data replicated from broker 1301 in a buffer, queue, or local cache. When transactions are completed and work items are no longer pending, the replicated data from broker 1301 shows this and broker 1302 may delete data that is no longer relevant. It is noted herein that high availability parings on a topology are reflected in the routing tables. Therefore any node may enquire the state of paring for all of the other nodes.

Broker node 1303 has an active link to broker node 1302 and is a back up node to broker node 1302. Therefore, broker node 1302 replicates its relevant data to broker 1303. Likewise, broker node 1304 has an active link to broker node 1303 and is the backup node for broker 1303. Broker 1303 replicates its relevant data to broker 1304. Finally, broker node 1301 has an active link to broker node 1304 and serves as a backup node to broker 1304. Broker node 1301 replicated data from broker 1304.

If any one of brokers 1301 through 1304 suddenly fails, its replication peer is triggered by the failure to finish the processing of the work items in the queues of the queue network segment affected. This backup processing continues until all of the existing workflow associated with the failed broker node is complete. A failed node cannot broker acceptance of any new work so the actual backup processing is temporary until all of the resolvable transactions that were in progress at the time of failure are completed.

However, when a broker node fails, it may trigger a reassignment of the high availability-paring scheme so the node that was backing up the failed node must find a new node to back up. Similarly the node that the failed node was backing up must find a new peer to back it up. By design the brokers that are rendered peerless by a node failure may form a high availability paring. A high availability paring may also be reassigned due to a new broker node being added to a community of broker nodes on a topology.

Figure 14:
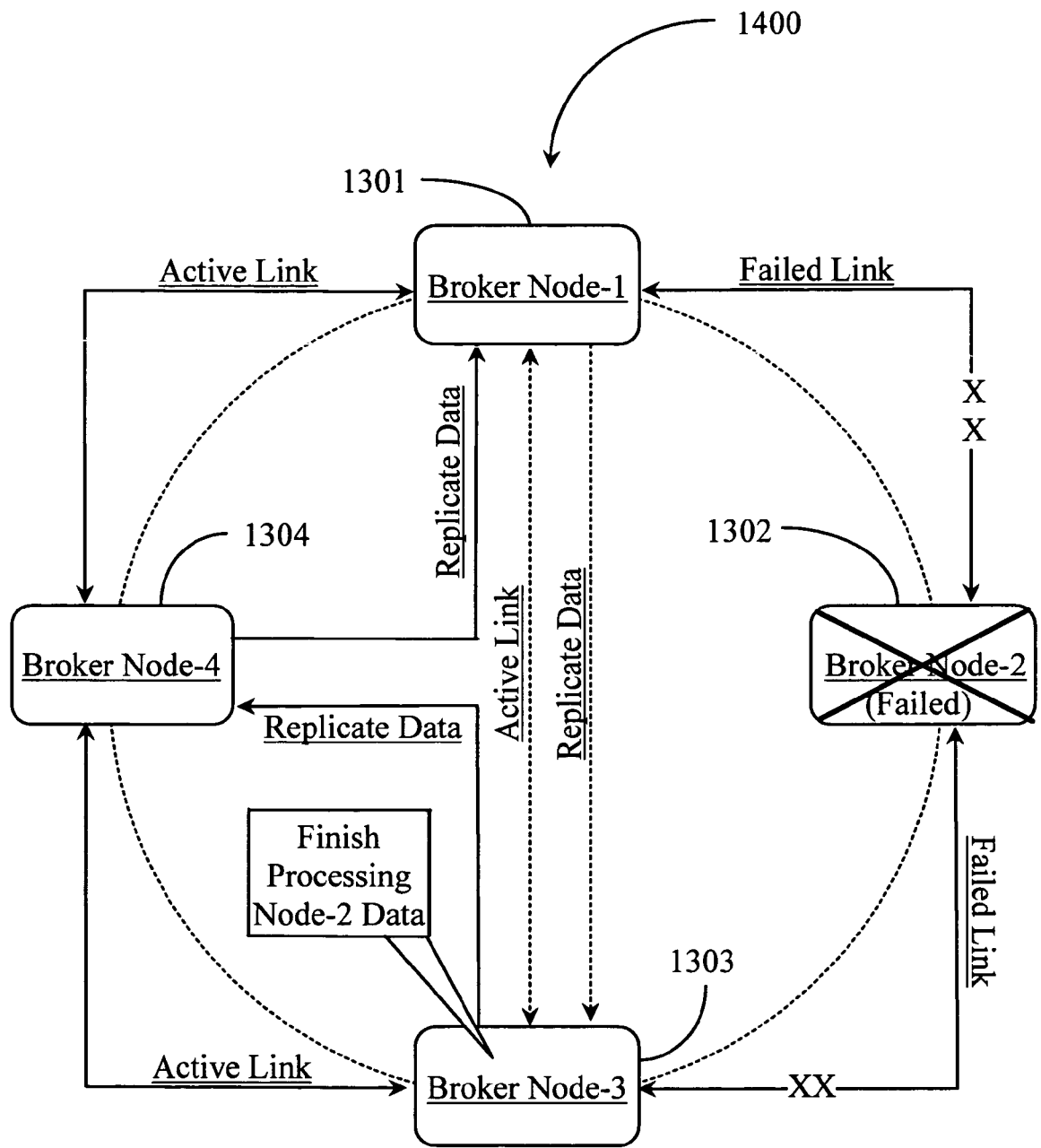
FIG. 14 is a block diagram of a broker replication architecture illustrating a failed broker triggering a reassignment of backup and replication.

FIG. 14 is a block diagram of a broker replication architecture 1400 illustrating a failed broker triggering a reassignment of backup and replication. Architecture 1400 is analogous to architecture 1300 with the exception of a failed broker node 1302 and subsequent re-assignment of high availability peers according to an embodiment of the invention. In this example, broker 1302 has suddenly failed. Therefore, the formerly active links between broker 1302 and peers 1303 (backup) and 1301 (replication source) are broken.

In this case, broker node 1303 is reassigned to backup broker node 1301. Broker node 1301 begins replicating its relevant data to broker node 1303. Also, a new active link is formed directly between the broker instances. The reassigned logical links are illustrated in dotted lines showing the new bi-directional communication channel and the new data replication path from node 1301 to node 1303. In addition to being reassigned in a new peer relationship, broker node 1303 must finish processing the workflow formerly brokered by broker node 1302 until all pending transactions and processes are complete for all of the remaining queued work items. In a preferred embodiment, all external applications have backup or secondary links which may be activated in case of a failed node. Therefore, generation and processing of new work items continues un-hindered. More detail about primary and secondary application links is provided later in this specification. Deleted previous incorrect reference and inserted correct description.

Figure 15:
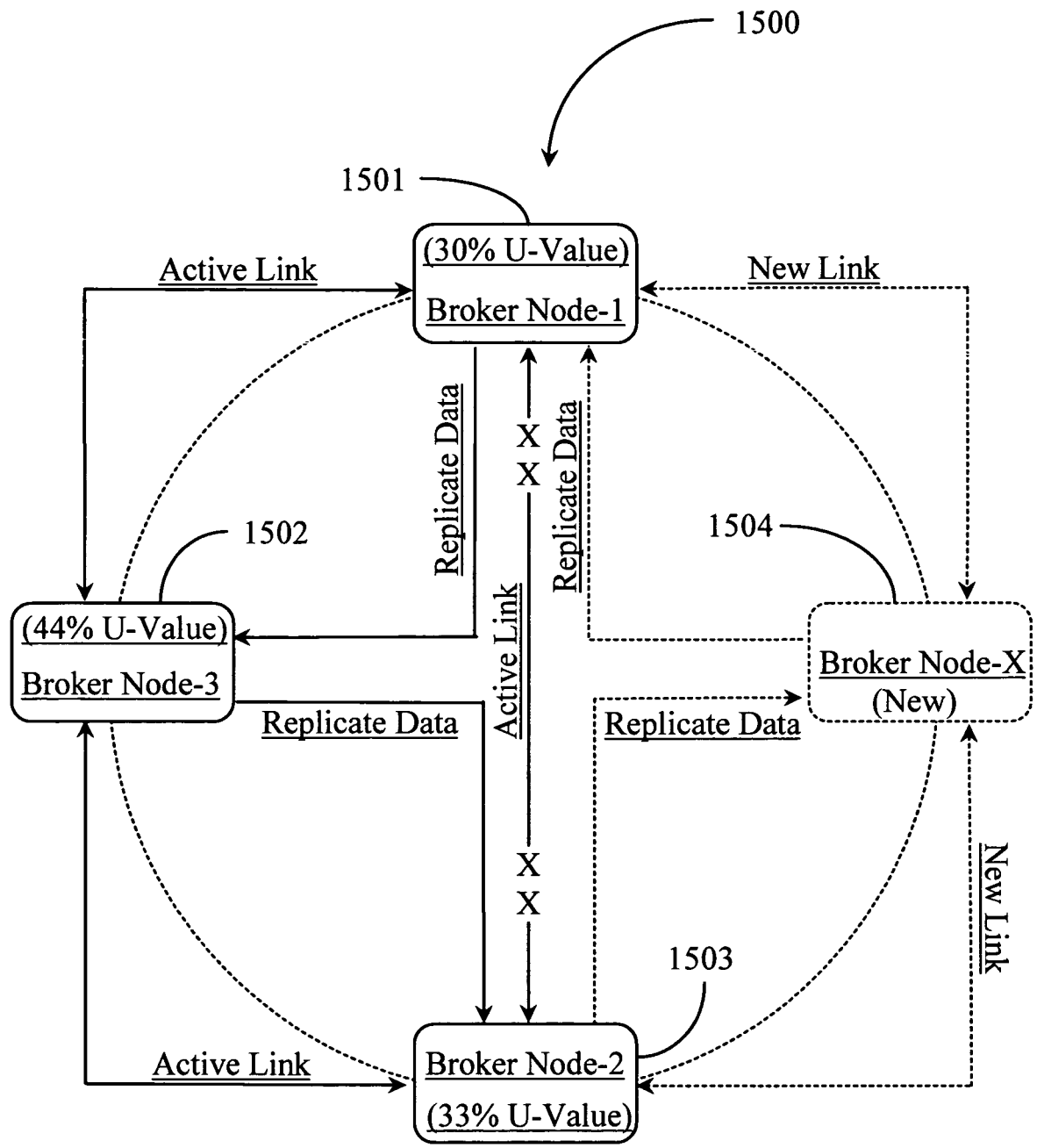
FIG. 15 is a block diagram illustrating a broker replication and backup architecture accepting a new broker node and reassigning high availability peers according to an embodiment of the present invention.

FIG. 15 is a block diagram illustrating a broker replication and backup architecture 1500 accepting a new broker node and reassigning high availability peers according to an embodiment of the present invention. Architecture 1500 originally contained 3 broker nodes. These are broker nodes 1501 (broker node-1), broker node 1502 (broker node-2), and broker node 1503 (broker node-3).

The configuration as illustrated before adding a new broker has broker 1501 backing up broker 1503 and receiving replication data from broker 1503. Broker 1503 is backing up broker 1502 and therefore receives replication data from broker 1502. Broker node 1501 is backup for broker node 1502 and node 1502 receives replication data from node 1501.

When a new broker instance is executed such as broker instance 1504, it looks in the routing tables once it is accepted and validated. It looks for the old backup architecture and makes an adjustment. In other words a change in high availability paring is performed. In this case, the active link formerly between broker node 1501 and broker node 1502 is torn down. New broker node 1504 determines which of the other broker nodes it should form a peer relationship with. The determination is based on algorithm expressed in pseudo code as follows:

```
IF DIRECT CYCLIC REFERENCE EXISTS THEN
        BREAK CYCLIC REFERENCE
ELSE
        CHOOSE LEAST UTILIZED NODE
END IF
```

The above algorithm works to ensure that there is always an attempt to break a cyclic reference wherein there are 2 nodes serving as backup for each other. If this were the case when a new broker is added, then a circular reference may be created by the new broker inserting it between the cyclic brokers. However, this is not the case with this example. In this example, there is already a circular reference before broker node 1504 (broker node-X) comes online.

In this example, the remaining half of the algorithm applies. The new broker must choose the least utilized broker as a backup broker and must begin replication of its data to that node. A least utilized broker node will be one that retains the most resources like bandwidth, memory, CPU processing power, or the like. These utilization factors may be combined to form a single percentage. Broker node 1501 is the least utilized of all of the broker nodes on the topology with only a 30% utilization factor. Broker node 1503 has the highest utilization factor of 44% and broker node 1502 has a 33% utilization factor.

Therefore, new broker node 1504 chooses broker node 1501 to serve as a backup and replication peer. New broker node 1504 replicates its relevant data to its backup (node 1501). Broker node 1504 forms a new active bi-directional communications link with broker node 1501. The former peer relationship between broker 1501 and broker 1502 is void and broker 1504 replaces broker 1501 as a high availability peer (backup node) to broker node 1502. Broker 1504 forms a new active link with broker 1504 and broker 1502 replicates its relevant data to broker node 1504. A new circular reference is formed and no broker nodes are in a cyclic relationship meaning that they are not serving as peers for each other. Since no nodes were gracefully shut down and no node failed, there is no actual backup processing to perform.

Figure 16:
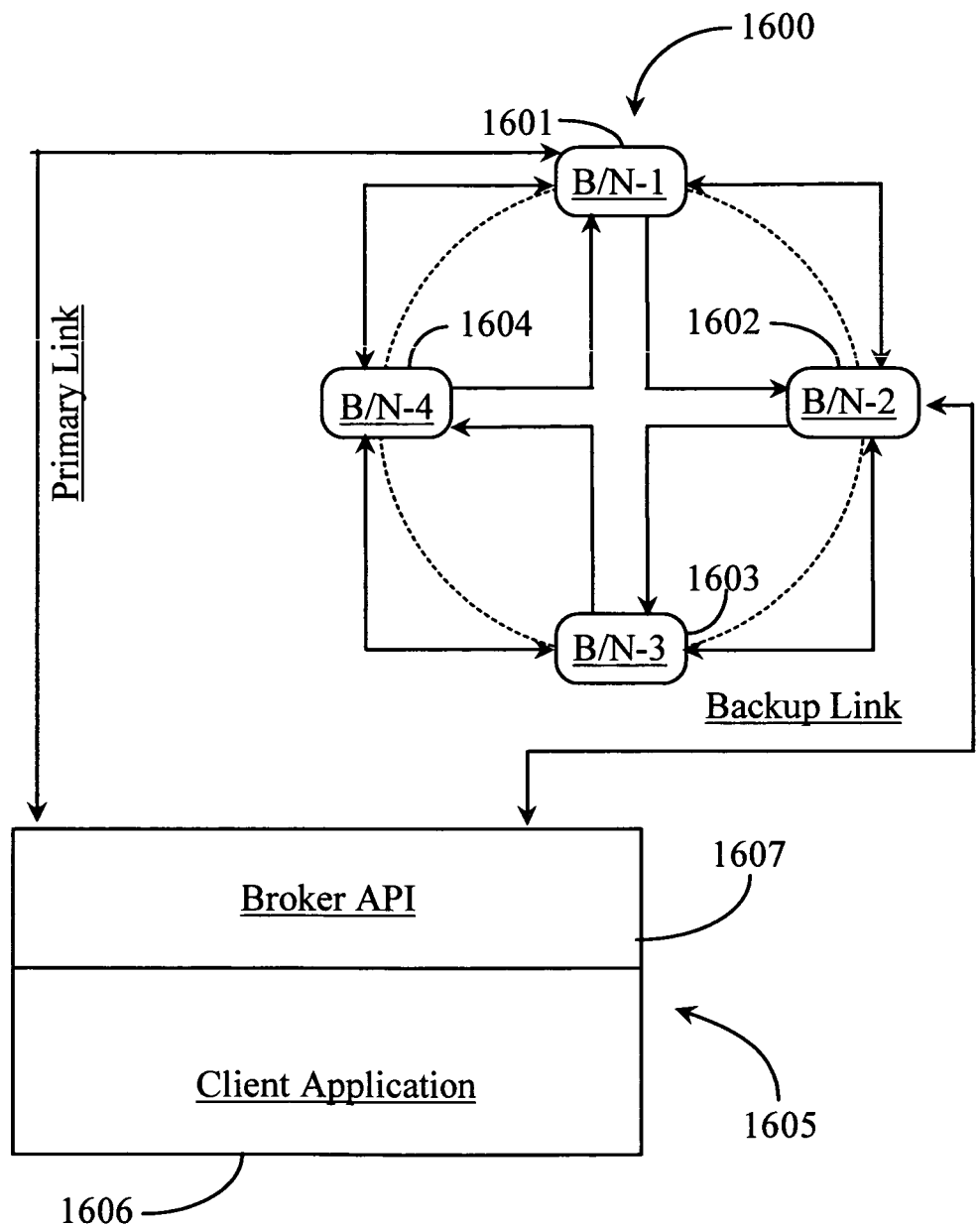
FIG. 16 is a block diagram illustrating a primary and backup failsafe communication link between a client application and broker community according to an embodiment of the present invention.

FIG. 16 is a block diagram illustrating a primary and backup failsafe communication link between a client application 1605 and broker community 1600 according to an embodiment of the present invention. Client application 1605 may include client application logic 1606 and a broker application program interface (API) 1607. Broker instances manage communication between external applications and the various queue components distributed under the domain of those brokers. The broker API actually refers to the collective instances of conduit, workflow, user, administration, and reporting APIs that allow the integration between those components and external applications.

In this example, a broker community 1600 is illustrated and includes broker nodes 1601, 1602, 1603, and 1604 also referenced herein as broker nodes (B/Ns) 1-4. This broker community has formed a high availability paring amongst the include nodes such that there are no cyclic references. Node 1602 is a backup for node 1601. Node 1603 is a backup for node 1602. Node 1604 is a backup for node 1603. Node 1601 is a backup for node 1604.

In this example, client application forms a primary bidirectional link to broker node 1601 of community 1600 for the purpose of processing work items for example. Broker 1601 functions as a proxy between the application and the specific queue or queues the application is working. Because there is a known backup broker node for broker 1601 (node 1602), application 1605 forms a bi-directional failsafe backup link to broker node 1602. This failsafe link is not actively transmitting any data as long as the primary link is not broken. However, if broker 1601 should fail and the primary link is lost, then the failsafe backup link may become the primary link so that the client application may finish processing the work items that were left in queue and still pending.

In one embodiment, one broker may continue to server as a backup to a down instance as long as that instance is down by performing a reassignment of broker identity to all of the components that were distributed under the down broker. In this way, the functioning broker may annex all of the components of the down broker until the down broker is functioning again. This may be practiced in a limited fashion depending on CPU capabilities, bandwidth allocation and memory capacity available to the annexing node. Therefore, it is noted herein that in certain circumstances it is ok to lose one or more brokers for an extended period of time without significantly affecting the processing of work items that entered the system under the domain of the failed broker. Likewise, new brokers may be brought online at any time to help with workload. For example, a broker managing communication for many queues may be reaching capacity. At this time a new broker may be added to the community and some of the queues may be reassigned to the new broker.

Figure 17:
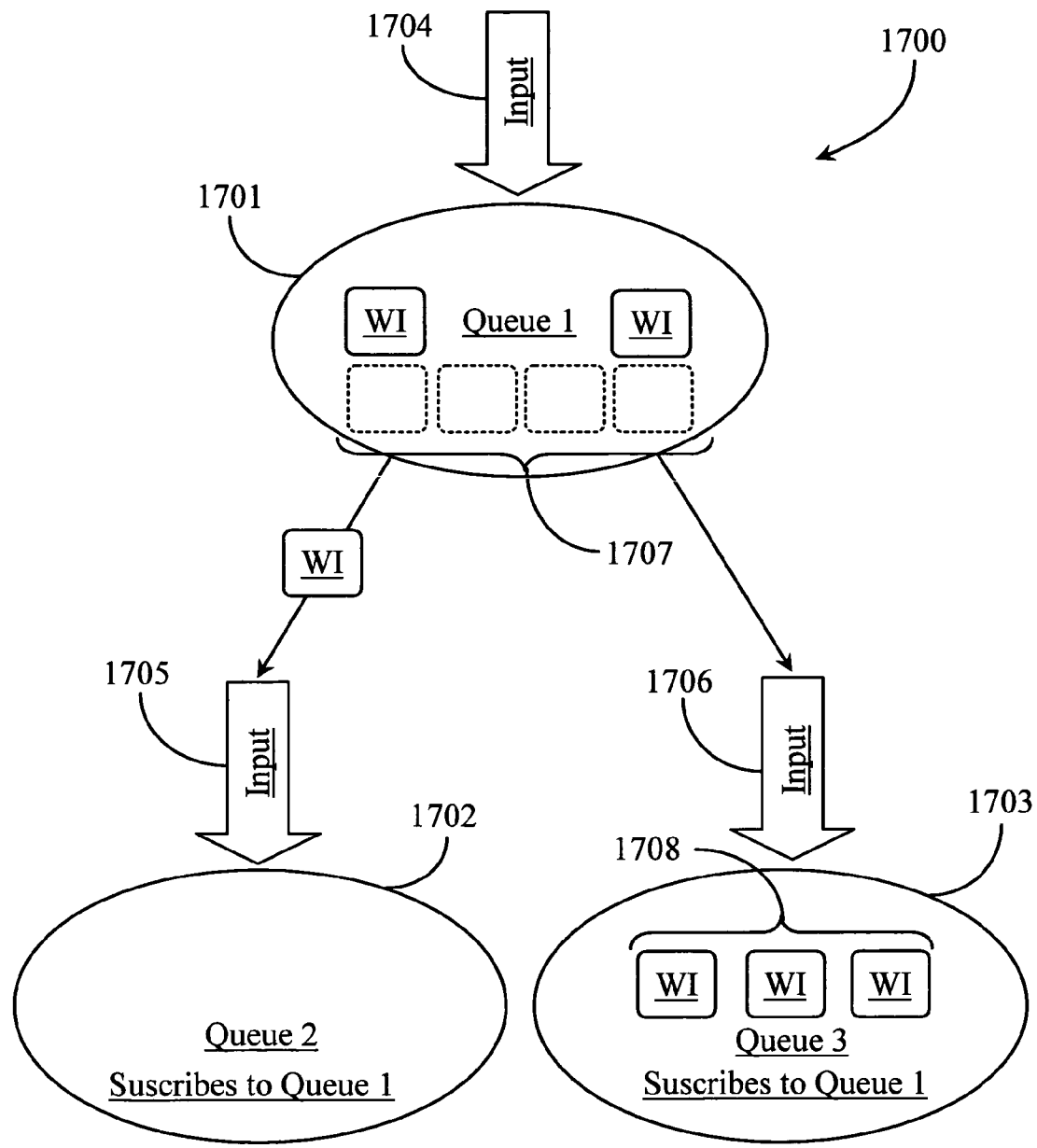
FIG. 17 is a block diagram illustrating queue-subscription architecture according to an embodiment of the present invention.

FIG. 17 is a block diagram illustrating queue-subscription architecture 1700 according to an embodiment of the present invention. Architecture 1700 includes three queues. These are a queue 1701 (Queue-1), a queue 1702 (Queue-2), and a queue 1703 (Queue-3). Queue 1701 has a queue input 1704 and may be thought of as a work item publisher following a publish and subscribe model. In this example there are two work items pending in publisher queue 1701. In one embodiment, queue 1701 is analogous to a conduit integration component because it has no subscriptions to any queues. It is the conduit for generating work items into the system.

Queue 1702 has a subscription to queue 1701. Queue 1703 also has a subscription to queue 1701. Queues 1702 and 1703 have queue inputs 1705 and 1706 respectively. A set of work items 1707 has been de-queued from queue 1701 and has been propagated to the subscriber queues according to priority and/or other enterprise rule or conditions. Dotted boxes represent that the work items were first in queue 1701. Three of work items 1707, now illustrated as work item set 1708 are queued within subscriber queue 1703. One of the work items 1707 is in a state of transfer from queue 1701 to queue 1702. In this example queue 1703 is accepting more work items than queue 1702 over a same period of time. There may be many different reasons for that condition. One might be that queue 1703 is more empty than queue 1702. Another reason for the disparity might be that of a subscription attribute. In other words, queue 1703 may subscribe to one type of two types of work items that may be generated in and dequeued from queue 1701. Queue 1702 may subscribe to the other type of work item. The disparity then is based on which type of work item is more prevalent or common.

In one embodiment, queue subscription may simply ask for any work items. In that case the propagation of work items between queue 1701 and queues 1702 and 1703 may be load balanced. In still another embodiment, work items may be replicated in one of the subscriber queues and later merged back into single work items. In this way parallel processing may be practiced as previously described where more than one different process can be performed simultaneously.

A queue subscription object may have attributes including but not limited to a subscription name or label and the parameters of the subscribing queue, and a priority indication to help determine any preferred subscription links if there are any intended. For any queue to be able to accept new work items they may be required to pass certain criteria including but not limited to the following.

The queue must be in a state to receive a work item. In other words the queue must not be paused or disabled. The queue must not be in a state such that a high water mark can be violated or the queue has been allowed to exceed any specified watermark.

It is noted herein that one external application may be processing queues 17011, 1702, and 1703 under one broker instance, or separate external applications may be processing the queues under separate broker instances without departing from the spirit and scope of the present invention. The appropriate manager instances within the one or more broker instances involved manage the access and communication, including propagating the work items from queue to queue. The arrival of a work item into a queue triggers processing of the work item and then de-queuing of the work item into the next subscriber queue unless the current queue is a final destination or user queue. The only knowledge required of any processing applications is that there are pending work items to process in the specific queues assigned to the application.

Figure 18:
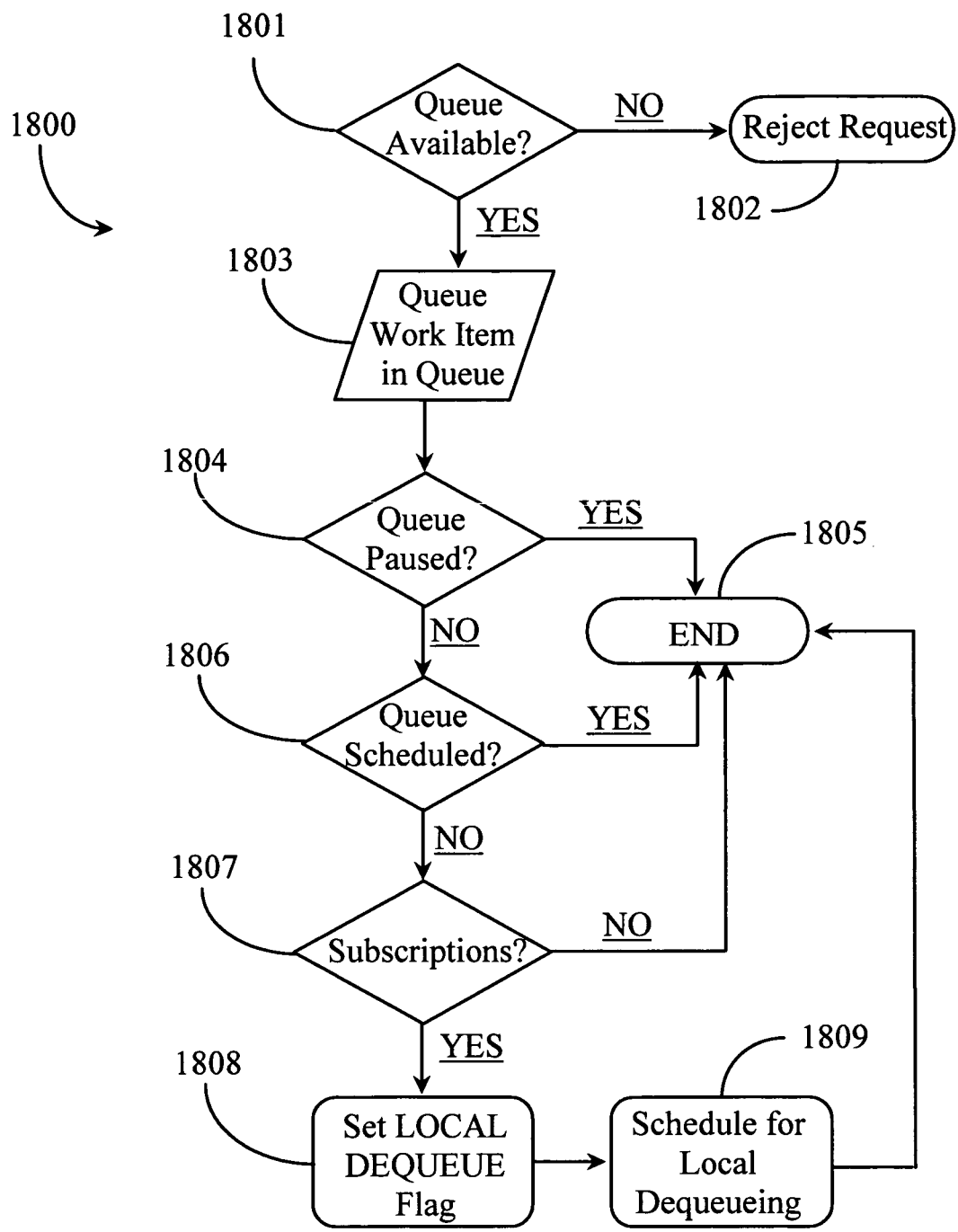
FIG. 18 is a process flow chart illustrating acts of accepting a work item into a queue and enabling traversal of a queued item to a next queue according to an embodiment of the present invention.

FIG. 18 is a process flow chart illustrating acts 1800 of accepting a work item into a queue and enabling traversal of a queued item to a next queue according to an embodiment of the present invention. Acts 1800 assume that a request has been made by an external application to generate and queue an item or that a queue engine manager has set a de-queue flag for the work item in a previous queue. In act 1801, the communications broker instance determines if a queue is available to accept a work item. This applies to conduit integration components (CICs) as well as all subscribing queues. If no queue is currently available then in act 1802, the request is rejected. If there is a timeout or TTL imposed on a work item and it expires, it may be diverted to another queue adapted for processing work items that have timed out before progressing to a next queue.

At act 1801 if it is determined that a queue is available then at act 1803, the work item is accepted and queued. A queue that is paused may accept work items as long as it is not full. At act 1804, the broker determines if the queue that just accepted a work item is paused. If the queue is in a state of pause, at act 1804, then the process ends at act 1805. If the queue is not paused at act 1804, the broker determines if the queue is scheduled at act 1806. This determination checks to see if there are any outstanding schedule requests for the queue. If there is an outstanding schedule request in act 1806, then the process ends at act 1805. If the queue is not scheduled in act 1806, the broker determines if there are any active subscribers to the queue in act 1807. If there are no subscribers found in act 1807, then the process ends at act 1805.

If there are subscribers found at act 1807, then the broker sets a local de-queue flag at act 1808 and schedules the queue for local de-queuing at act 1809. After the scheduling is performed, the process ends at act 1805. Acts 1800 may be repeated in sequence for every work item generated at each queue the work item resides in including a user queue before final user processing is performed.

It will be apparent to one with skill in the art that there may be more or fewer acts 1800 than are illustrated in the example without departing from the spirit and scope of the present invention. For example, if there is more than one subscriber found at act 1807, then a process for determining which subscribing queue will receive the work item may be initiated.

Figure 19:
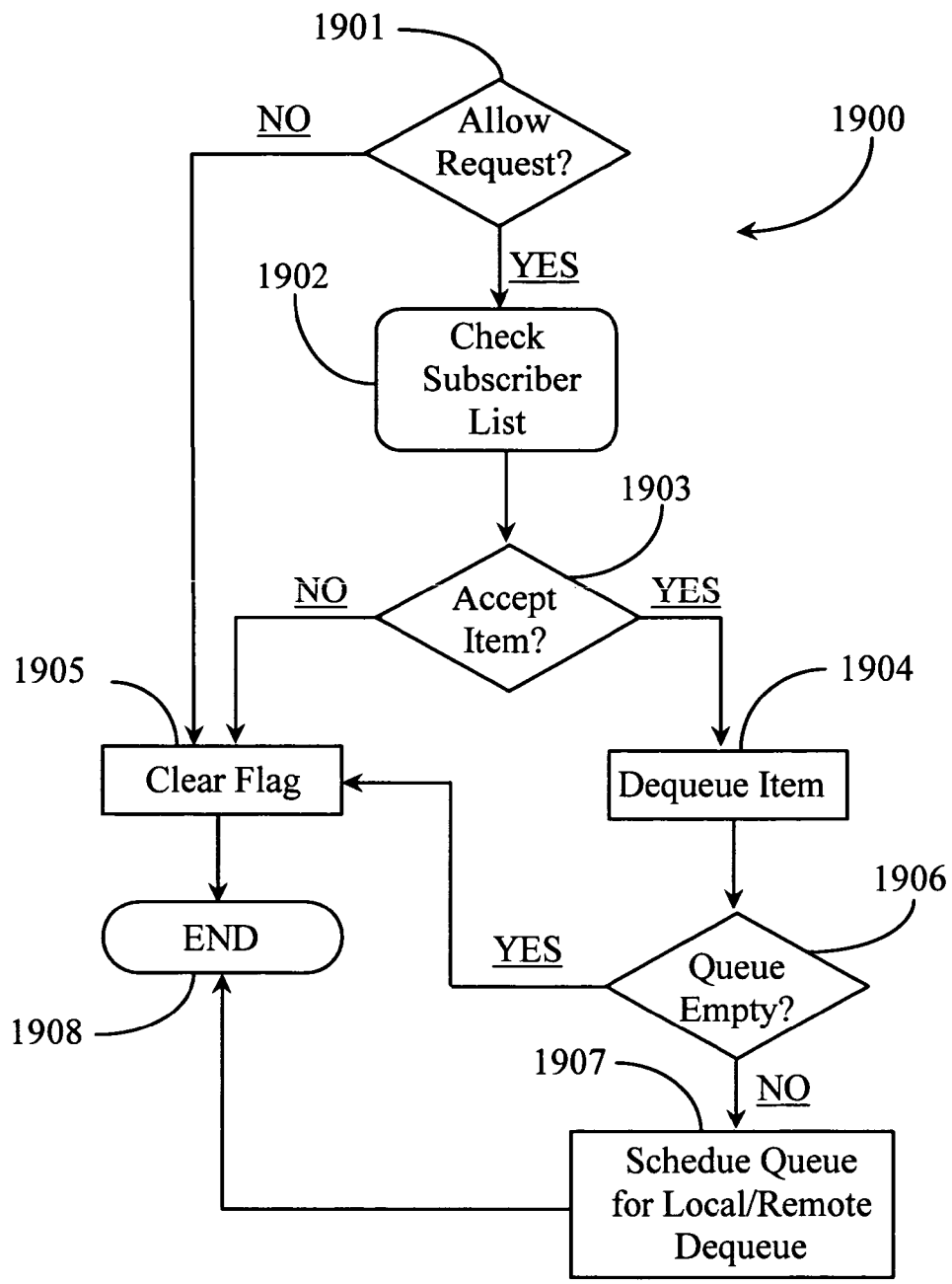
FIG. 19 is a process flow chart illustrating acts for scheduling a queue according to an embodiment of the present invention.

FIG. 19 is a process flow chart illustrating acts 1900 for scheduling a queue according to an embodiment of the present invention. At act 1901, a broker determines if an existing de-queue schedule request is still valid. Such a determination may rely on sub determinations or checks to verify that the queue is not currently empty; the queue has a state that is compatible with a scheduled de-queue operation; the queue is not deleted or marked for deletion; and the queue still has one or more valid subscribers that are in a state to accept work.

If at act 1901, the request is not valid, then at act 1905, the de-queue scheduling flag is cleared and the process ends at act 1908. If the request is a valid one at act 1901, then at act 1902, the broker polls the subscriber list to check if any can accept work items. There may be one or more subscribers to this queue. Again the queue criterion as stated further above may be considered before determining if any of the subscribers may accept a new item. In one embodiment, subscribing queues publish there current state as a single value that informs whether they may accept new items. In another embodiment, subscription state is reported negatively or ids temporarily paused if the subscribing queue cannot accept a work item.

If at act 1903, it is determined that there are no subscribers that can accept the work item, the process resolves back to act 1905 wherein the schedule flag is cleared and to act 1906 the end of the process. If at act 1903, a subscriber queue can accept the item, then at act 1904, the broker de-queues the item. The act of de-queuing the item from the existing queue also queues the item into the subscriber queue. There may be additional acts and criteria to consider if more than one subscriber exists for the queue and is in a state to accept the work item.

At act 1906 the broker determines if the queue is now empty. If it is empty at act 1906, then the broker clears the schedule flag at act 1905 and the process ends at act 1908. However, if the queue is not empty then at act 1907 the broker schedules the queue for both local and remote de-queuing.

It will be apparent to one with skill in the art that there may be more or fewer acts 1900 than are illustrated in the example. For example, there may be more than one subscriber able to take a work item and a work item may be replicated among more than one subscriber for parallel processing. Moreover, there may be a subscription attribute for a particular type of work item and therefore some subscribers able to take a work item may be passed over if they do not subscribe to the particular work item type for which a de-queue is requested.

In another embodiment, when a work item enters a conduit the plan for processing the work item is already known to the local broker and therefore, all of the hops in the queue network may already be known. In this case, at each hop after processing is complete, the item automatically de-queues to the next hop triggered by the processing state (pending or complete). The case of whether scheduling is required for a queue or for work items in a queue may depend entirely of the type of business process being performed and the possible options available in a transaction (complexity). For example, if all that is required for a system-defined transaction is an affirmation or denial related to a single work item, then strict scheduling for de-queuing may not be required. It will also be apparent to one with skill in the art that the acts or processes 1800 and 1900 may run together and cycle from one process back to the other.

Figure 20:
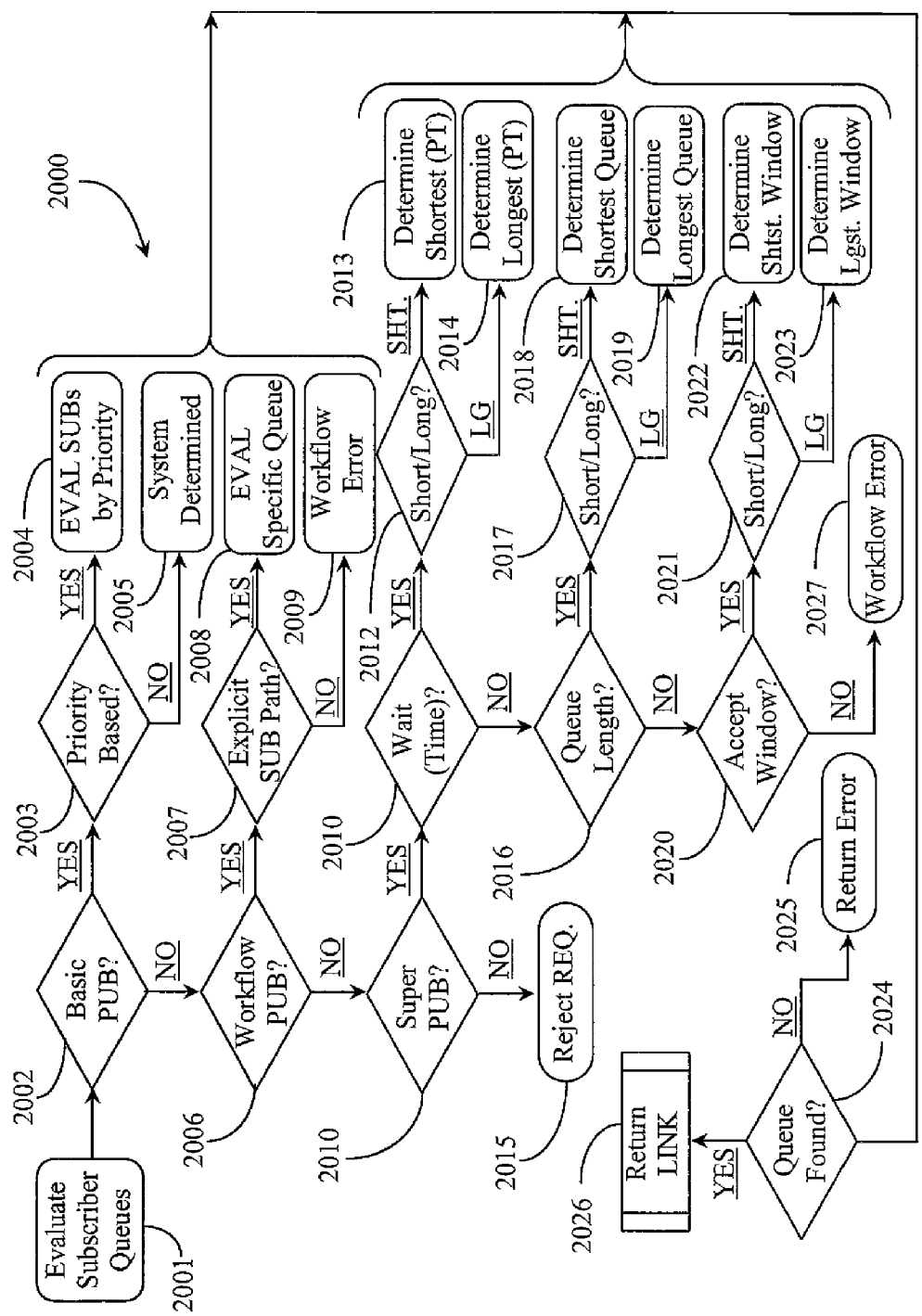
FIG. 20 is a process flow chart illustrating acts for evaluating and selecting subscriber queues to receive work items according to an embodiment of the present invention.

FIG. 20 is a process flow chart illustrating acts 2000 for evaluating and selecting subscriber queues to receive work items according to an embodiment of the present invention. To evaluate a subscriber queue for the purpose of targeting that queue to receive a work item, the queue that is publishing work items to subscribers may also be evaluated. The following description summarizes queue types of the present invention and possible criteria for evaluation.

Publishing Queue Type: (Basic Queue)
Subscribing Queue Evaluation Options: (Link Priority); (No Priority)
Link Priority—Subscribers are evaluated based upon the order of decreasing priority assigned to the subscriber links between the publishing queue and subscribing queue.
No Priority—Subscribers are evaluated based upon system-determined evaluation criteria including but not limited to the order in which they were created.
Publisher Queue Type: (Workflow Queue)
Subscribing Queue Evaluation Options: (Explicit Selection)
Explicit Selection—Subscriber is evaluated based upon an indicated subscriber link the indication based on a processing result realized by external workflow application process or task completion.
Publisher Queue Type: (Super Queue)
Subscribing Queue Evaluation Options: (Expected Wait Time); (Queue Length); (Acceptance Window)
Expected Wait Time—Subscribers are evaluated for either the shortest or the longest expected wait time while in queue. Wait time includes processing time.
Queue Length—Subscribers are evaluated for either the shortest or the longest queue relevant to the number of pending work items in the queue.
Acceptance Window—Subscribers are evaluated for the shortest or longest time passed since a previous work item entered the queue.

The only queue type not addressed in the above listed criteria is a user queue. A user queue does not have subscribers; therefore process 2000 does not apply to a user queue.

Now referring to FIG. 20, at act 2001 evaluation of subscriber queues begins. At act 2002, it is determined if the publishing queue is a basic queue. If this is correct, then at act 2003 it is determined whether the evaluation rule is priority based. If at act 2003 it is determined that the evaluation is based on priority then at act 2004, the subscriber queues are sorted by descending priority. The process then resumes to act 2024 to determine if a subscriber queue was targeted based on the results of act 2004. If no subscriber queue could be qualified, then at act 2025 an error message is returned. If a queue was found at act 2024, then the link to that subscriber queue is returned at act 2026 and the work item may be de-queued into that subscriber queue. It is noted herein that criteria described previously may also be used to help determine an appropriate subscriber queue to accept a work item from the publishing queue.

Now referring back to act 2003 for a basic queue, if it is determined that the evaluation is not based on priority, then at act 2005 the subscriber queue is system determined based on enterprise rules. The process moves, in this case, to acts 2124 and 2125 if no queue could be qualified by the system and to act 2126 if a subscriber queue was determined by the system.

Referring back to act 2002, if the publishing queue is not a basic queue then at act 2006 it is determined whether or not it is a workflow queue. If at act 2006 the queue is determined to be a workflow queue, then at act 2007 it is determined whether the evaluation criteria is explicit selection via a specific subscription path. If the determination is affirmative at act 2007, then the specified queue is evaluated at act 2008 according to any other requirements such as those described previously. The process then moves ahead to act 2024 to determine if the specific queue qualifies. If not at act 2025 an error message is returned. If the evaluated queue qualifies to accept the work item then the link is returned at act 2026.

Referring back to act 2007 for a workflow queue, if it is determined that there is no specified subscription path then at act 2009 a workflow error has occurred. In this case, the process may end at act 2025 because no queue could be determined at act 2024 under the circumstance. Referring now back to act 2006, if the publishing queue is determined not to be a workflow queue then it is determined whether or not it is a super queue at act 2010. If in act 2010 the publishing queue is a super queue then at act 2011 it is determined whether or not the evaluation criteria is set to expected wait time or not. If at act 2011 the evaluation criterion is wait time, then at act 2012, it is determined whether the longest wait time or shortest wait time will be the sorting method. It is noted herein that expected wait time includes expected processing time.

If at act 2012 it is determined that the shortest wait time qualifies, then at act 2013 the system determines the most qualified queue having the shortest expected wait time. If at act 2012 it is determined that the longest wait time qualifies, then at act 2014 the system determines the most qualified queue having the longest expected wait time. The process then moves to act 2024 where it is determined if a queue was found. If not at act 2025 an error message is returned. If at act 2024 a subscriber queue was found then at act 2026 a link to the queue is returned. Regarding act 2026, the link is actually returned to the local broker instance, the link enabling traversal of the de-queued item to the next queue.

Referring back to act 2011 for a super queue, if it is determined that the evaluation criteria is not expected wait time, then at act 2016, it is determined if the evaluation is based on queue length meaning the number of work items held in the subscriber queue at the time of evaluation. If affirmative at act 2016, then at act 2017 it is determined whether shorter or longer queue length is preferred. If shorter queue length is preferred at act 2017, then at act 2018, the system sorts the candidates by the shortest queue length or the most qualified queue having the fewest number of work items queued. If longer queue length is preferred at act 2017, then at act 2019, the system sorts the candidates by the longest queue length or the most qualified queue having the highest number of work items queued. The process then moves on to acts 2024 then 2025 or acts 2024 then 2026 depending on the results of act 2018.

Referring back to act 2016, if it is determined that the evaluation criteria is not queue length then at act 2020 it is determined whether the evaluation is based on an acceptance window defined as a period of time from the time of evaluation of a subscriber queue back to the time a last work item was accepted into the queue. If at act 2020 the evaluation is based on an acceptance window, then at act 2021, it is determined whether a shortest window or a longest window is specified. If at act 2021 a shortest window is specified, then at act 2022 the system sorts by the shortest acceptance window. If at act 2021 a longest window is specified, then at act 2023 the system sorts by the longest acceptance window. The process then moves to acts 2024 then 2026 or 2024 then 2025 depending on the results.

Referring now back to act 2020, if it is determined that the evaluation is not based on an acceptance window, then at act 2027 a workflow error is generated. This may be because no evaluation criterion was specified for the determination of super queue. In another embodiment, if the system cannot determine criteria from the ones offered then a random selection might be made by default.

Referring back to act 2010, if it is determined that the publishing queue is not a super queue then at act 2015 the evaluation request is rejected because the publisher queue could not be verified by the system.

One with skill in the art will appreciate that there may be more acts or fewer acts than are illustrated in this example without departing from the spirit and scope of the present invention. For example, another evaluation option for consideration might be first available subscriber queue identified defined as the first queue that is found that can accept a work item. Other evaluation criteria might be any available subscriber queue with no specific order of selection required. A first available subscriber queue may be selected according to conditions including but not limited to imposing a wait time on the request in so that in the event of no available subscriber queues available at the time of evaluation, there is some time for one to become available.

Figure 21:
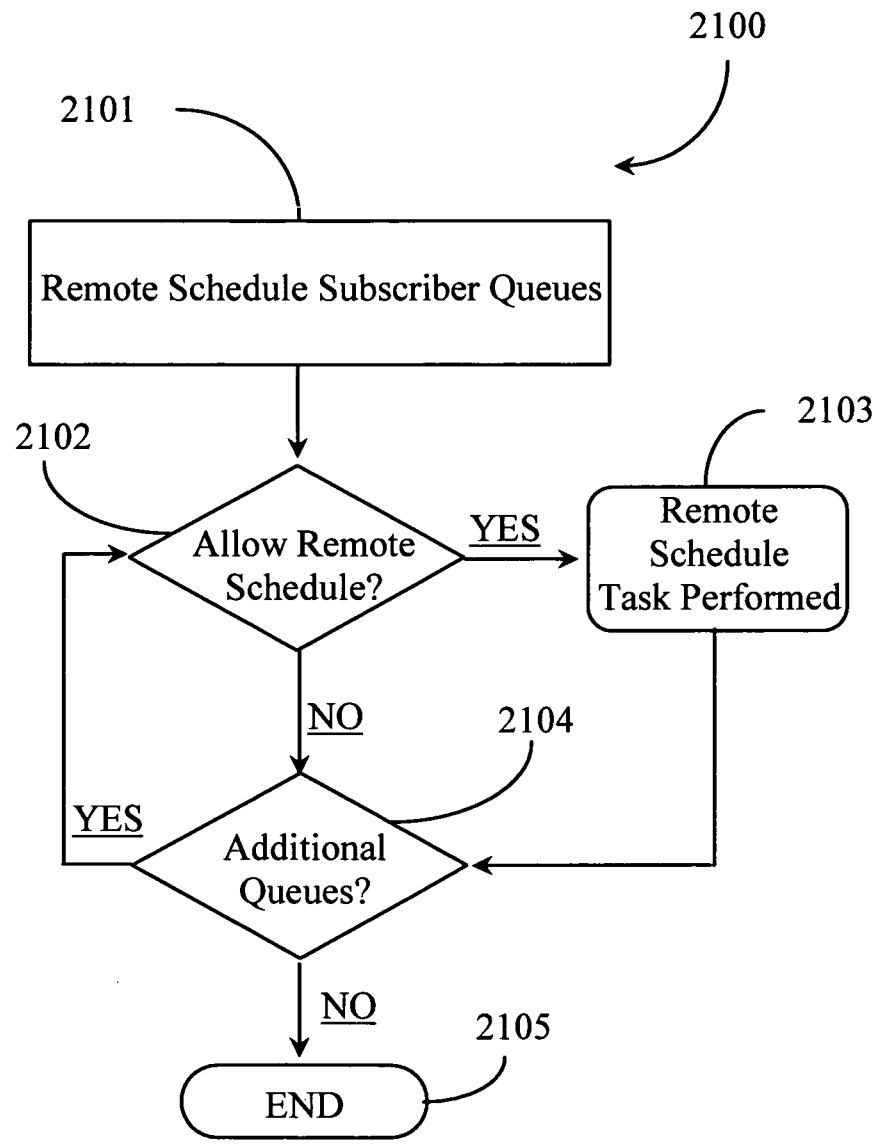
FIG. 21 is a process flow chart illustrating acts for remote queue scheduling according to an embodiment of the invention.

FIG. 21 is a process flow chart illustrating acts 2100 for remote queue scheduling according to an embodiment of the invention. At act 2100 a request for scheduling one or more subscriber queues comes in. Process 2101 assumes that a work item has been de-queued. At act 2102 a determination is made whether to allow a remote schedule for a subscriber queue. If at act 2102, the request is allowed for a particular queue, then at act 2103 a remote scheduling of that queue is performed. Acts 2101, 2102, and 2103 are repeated for each subscriber queue approved to accept the de-queued work item.

If at act 2102 it is determined not to allow remote scheduling for a subscriber queue, then at act 2104 a check to see if additional subscriber queues may be found. If not in act 2104 then the process ends at act 2105. If any additional queues are identified at act 2104 the process loops back to act 2102. Similarly, after each scheduling task is performed, the system checks to see if there are any more qualified subscriber queues at act 2104. If there are, the process loops back to act 2102. If there are no additional queues found in act 2104, then the process is complete. There may be one or several subscriber queues that may receive a work item de-queued from the target queue those subscribers have a subscription to. Not all queues found will be able to accept a new work item. Only those queues approved to accept the de-queued work item are scheduled to receive the item.

Figure 22:
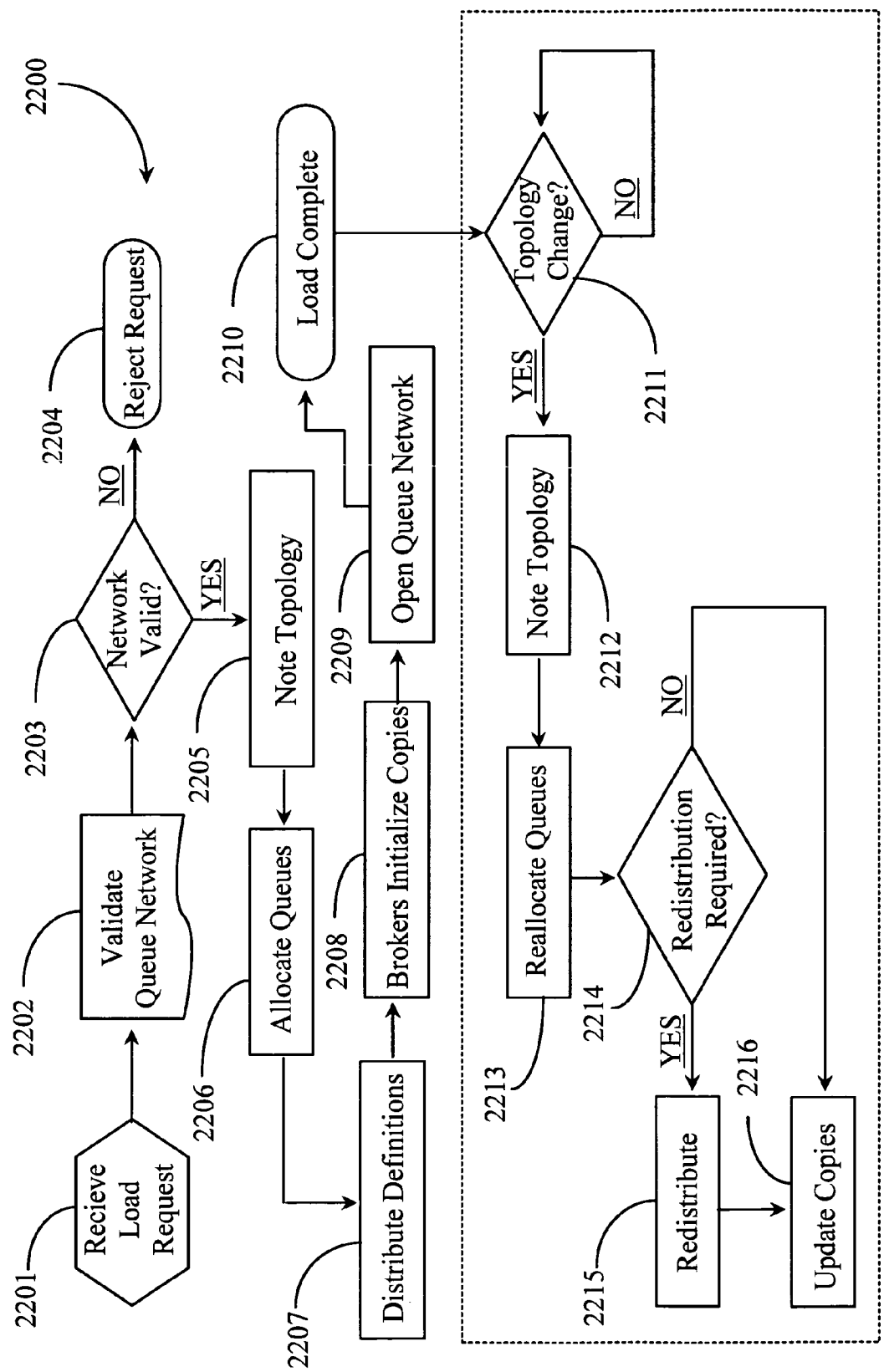
FIG. 22 is a process flow chart illustrating act for loading a queue network according to an embodiment of the present invention.

FIG. 22 is a process flow chart illustrating act 2200 for loading a queue network according to an embodiment of the present invention. At act 2201 a communications broker receives a load request. The request is initiated by an administration integration component previously described and the process is handled within the broker using the previously described components of FIG. 2. At act 2202, the broker may validate the queue network after receiving the load request. Such evaluation may determine, for example, if all of the components are properly configured for deployment over the topology. It is noted herein that the process involves the cooperation of an administration integration component (request initiator), a protocol handler (broker), an administration manager (broker), a message bus (broker), a deployment manager (broker) and possibly the remote services manager (broker).

At act 2203 a determination is made as to whether the queue network proposed is valid or not. If it is not a valid queue network at act 2203, then the request of 2201 is rejected at act 2204. The rejection message may include diagnostic information informing a user of what is wrong with the proposed queue network. If at act 2203, the queue network is determined to be valid, then the loading broker notes the current network topology at act 2205. This act may require some gathering of information to ensure that there are no conflicts with any existing installations and to identify other brokers responsible for managing portions of the proposed network across processing boundaries. The examination of the current topology may also consider current utilization factors such as but not limited to memory, disk space and CPU processing power. Other gathered information may include the locations of client integrations such as workflow integrations and conduit integrations. Such utilization factors may be used to influence any specific distribution algorithm defined within the queue network for the defined queues.

At act 2206, the broker allocates the queues of the queue network to the appropriate broker instances. The deployment manager component and the remote services manager within the broker perform this process. At act 2207, the definitions of the queues and queue relationships to each other and to external applications are distributed to the appropriate brokers hosted in those processing boundaries included in the topology through the remote services manager. It is noted herein that the distributing broker instance may be designated as a master broker node for the purpose of network queue distribution.

At act 2208, the receiving brokers initialize the queues according to their definitions. This process may be enacted when a broker receives a request through the remote services manager to initialize the allocated queues. The queue engine manager within the local broker initializes the queues. Additional shadow copies of queues may also be created for the purpose of high availability access by data replication (backup). At act 2209 the queue network is opened. At act 2210 the task of loading the queue network is complete. Notification of that fact may be sent back to the administration interface that launched the original loading request prior to act 2201.

Once the queue network is loaded and is operating. The topology over which the network is deployed may be monitored for any topology changes at act 2211. If there are no changes monitoring continues. Changes may include but are not limited to server outages, network outages and changes in resource utilization such as loading of new queue networks or unloading of previously loaded queue networks. If topology changes are found that affect the initial queue network distribution at act 2212, then the monitoring broker notes those topology changes with respect to the original topology. The broker instance responsible for loading the queue network may reallocate the queues to the appropriate broker instances at act 2213. Each broker receiving a queue reallocation notification may evaluate whether they are required to redistribute their queues at act 2214. If at act 2214 it is determined that no redistribution is required, then all of the brokers may update their copies at act 2216.

If at act 2214 it is determined that queue redistribution to other brokers is required, then those broker instances receiving the notifications may redistribute their queues to the other brokers at act 2215. Redistribution may include redistributing of complete queues, shadow queues, or partial queues. At act 2216 the brokers update their copies. It is important to note herein that client integration components like conduit, workflow, and user components are not just queues, but are the access points and processing points in the queue network. For example, one conduit or workflow component may manage one or more queues.

Figure 23:
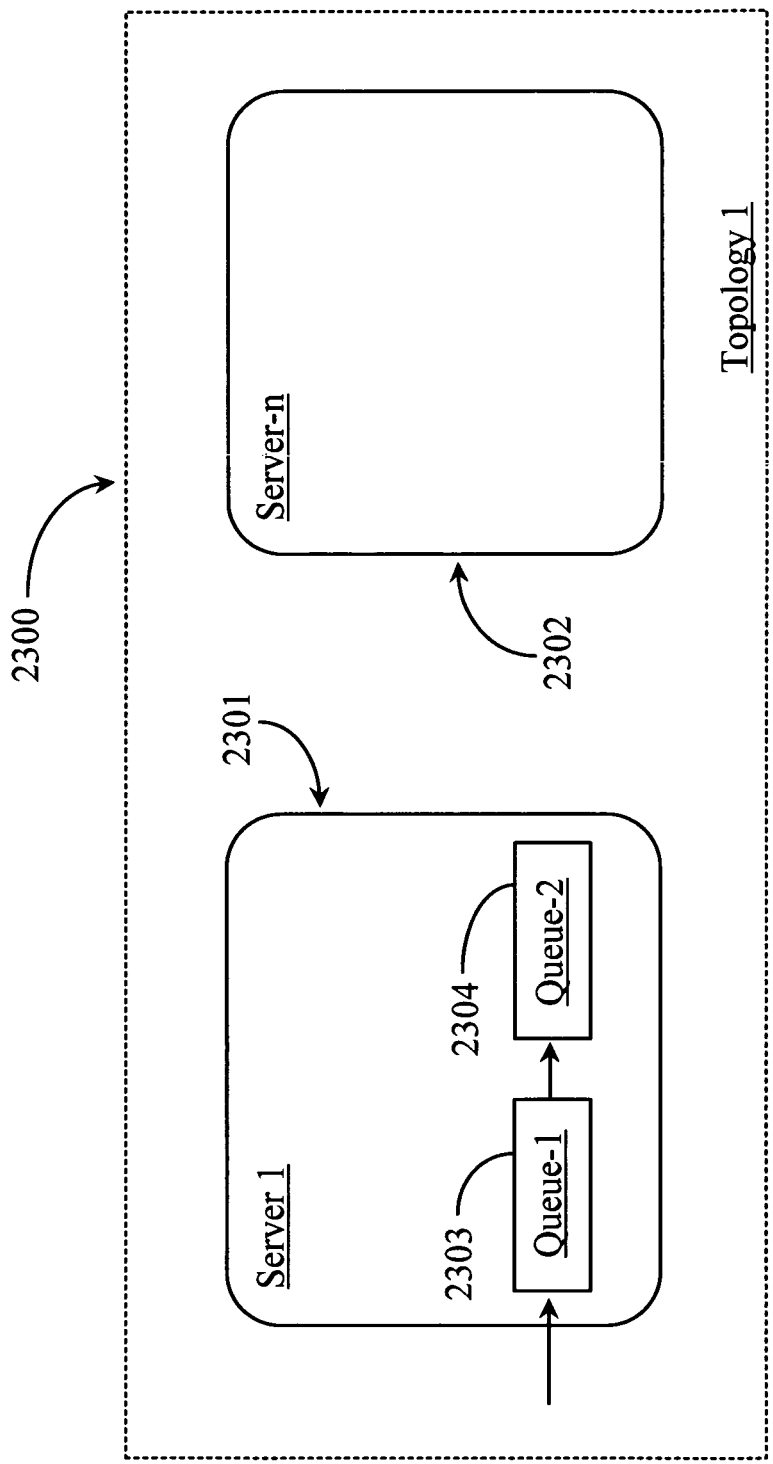
FIG. 23 is a block diagram illustrating a topology including processing boundaries and distributed queues.

FIG. 23 is a block diagram illustrating a topology 2300 including processing boundaries and distributed queues.

Figure 24:
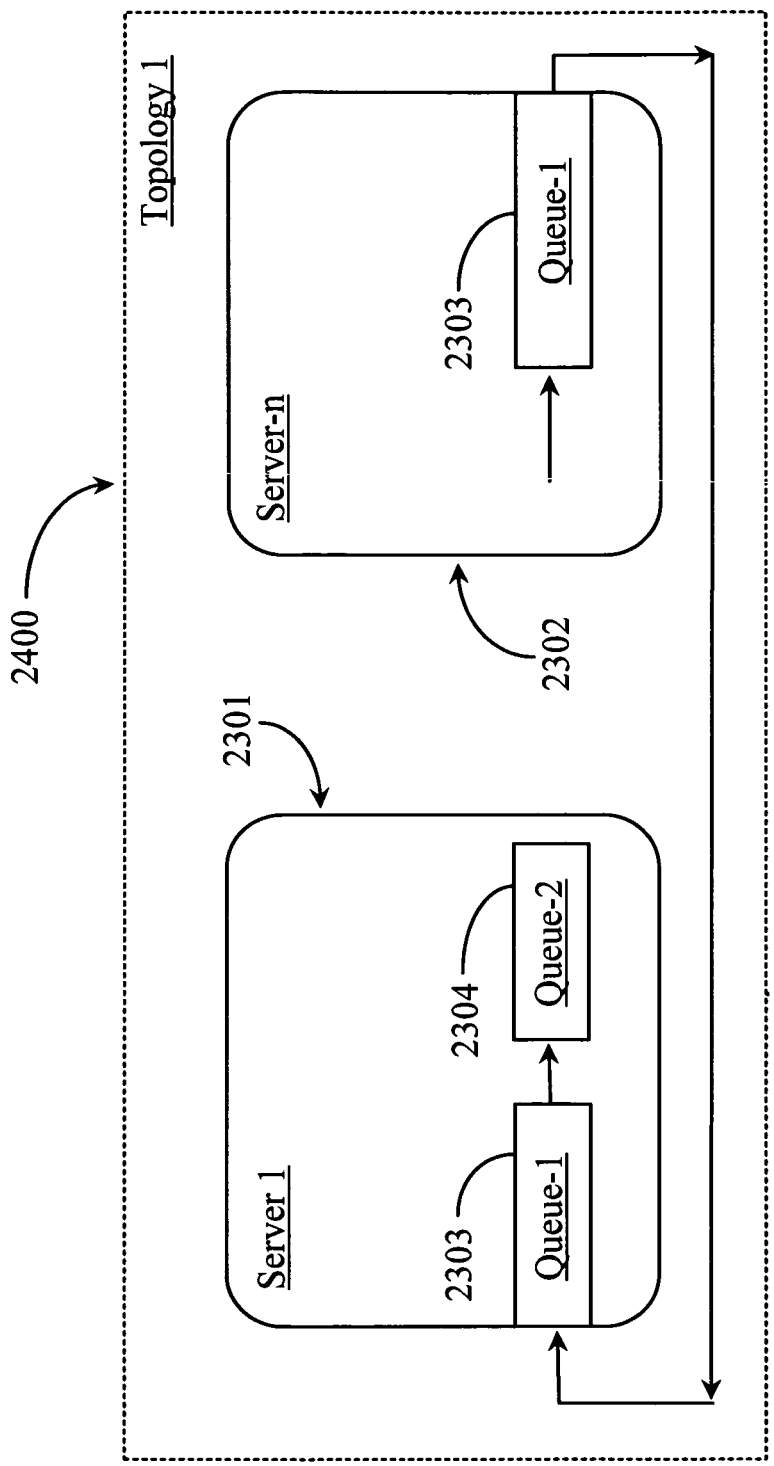
FIG. 24 is a block diagram illustrating queue redistribution.

FIG. 24 is a block diagram illustrating basic queue redistribution.

Referring to FIG. 23, topology 2300 (topology 1) includes processing boundaries 2301 and 2302 (server 1 and server n). It will be clear to one with skill in the art that there may be many more severs 1-*n* included in this example without departing from the spirit and scope of the invention. Server 2301 has a queue-1 (2303) and a queue-2 (2304) Queue 2304 is a subscriber to queue 2303. In this case, redistribution may be desired as a resource on the topology is not being utilized (server-n). Redistribution of queues 2303 and 2304 may be enacted so that processing boundary 2302 at least has some utilization and is not idle.

Referring now to FIG. 24, topology 2400 includes the previous mentioned components topology 1 and servers 1-*n*. In this case, queue 2303 and queue 2304 have a relationship that is within the processing boundary. During queue redistribution, queue 2303 may be partially distributed to server 2302. As illustrated here, the input is now on processing boundary 2302 and the output leads into a split input on a split portion of the original queue. Now the same queue runs on both servers. Any type of network capable appliance can be used to host a broker and local queues without departing from the spirit and scope of the present invention.

Figure 25:
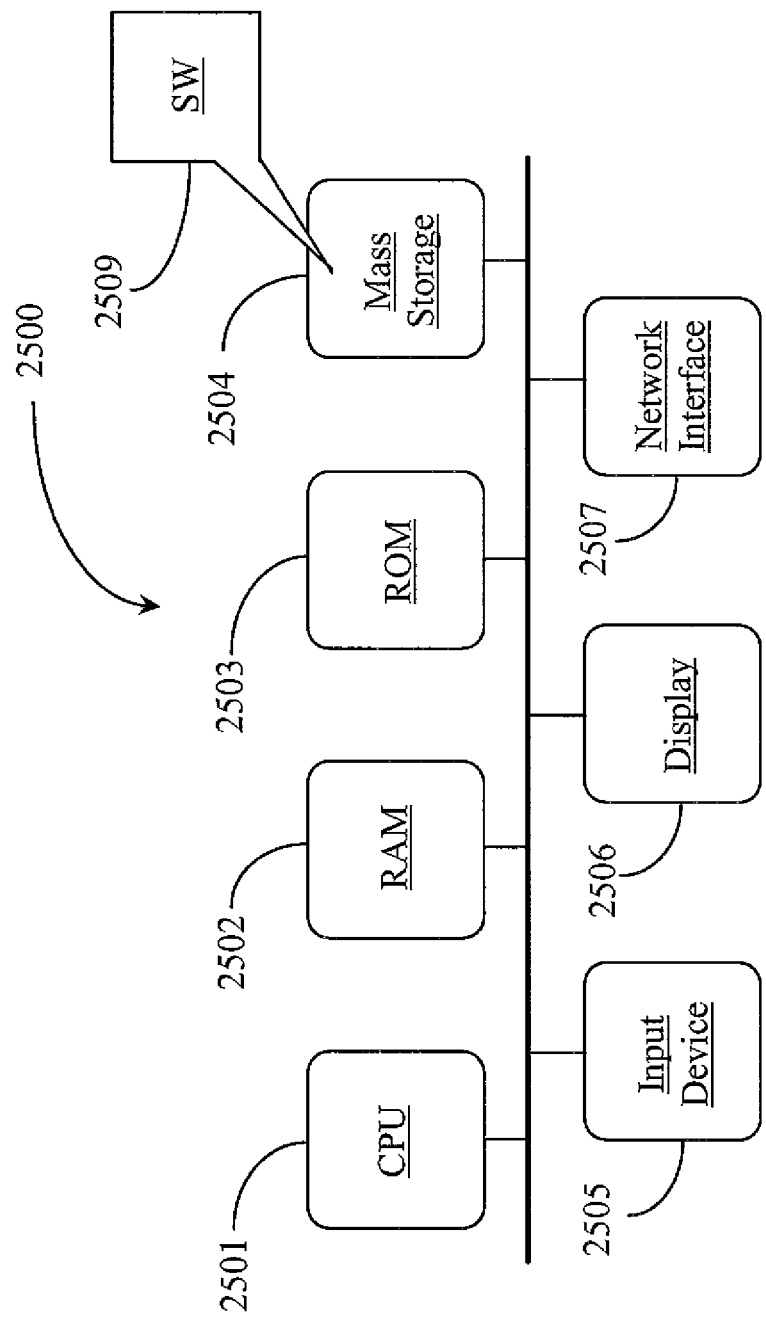
FIG. 25 is a block diagram illustrating a processing boundary and components according to an embodiment of the present invention.

FIG. 25 is a block diagram illustrating a processing boundary 2500 and components according to an embodiment of the present invention. Processing boundary 2500 may be a network server, a desktop computer, a personal digital assistance, an Ipod™, a Black Berry™ device, a digital cell phone, an Internet Protocol (IP) phone, a LAP top computer, or some other hand-held or desktop resident computing device without departing from the spirit and scope of the present invention. A distributed queue network may operate across a variety of these devices comprising processing boundaries on a topology (the collection of devices) as long as the devices can communicate with each other and can be accessed externally. Wireless networking protocols, telephony network protocols, Internet Protocol Network Telephony (IPNT) protocols, and others may be leveraged and/or combined to establish a communication network of the collective computing appliances such that a queue network can be realized. Network gateways, telephony switching apparatus, wireless routers and so on can be added to a network to extend a topology geographically or to bridge a topology deployed over more than one network type.

Processing boundary 2505 may include certain components that together enable practice of the present invention on the device. Such components may include but do not necessarily require a central processing unit CPU 2501, a random access memory (RAM) device 2502, a read only memory (ROM) device 2503, a mass storage device 2504, The software 2509, an input device 2505, a display device 2506, and a network interface 2507.

A mass storage device could be an external device and considering processing and storage requirements are distributed across multiple processing boundaries, a mass storage capacity on any single processing boundary may not be specifically required in order to practice the present invention. Likewise, a processing boundary is not required to have a graphical display capability in order to practice the invention. An administrator may be the only entity that requires a display for building queue networks and making modification to those networks when required.

The methods and apparatus of the present invention may be deployed over a variety of network architectures and may employ a variety of different kinds of computing devices without departing from the spirit and scope of the present invention. Moreover, the invention may be practiced using some of or all of the described components. The spirit and scope of the present invention is limited only by the following claims.

What is claimed is:

1. A method for configuring and deploying a pre-defined queue network comprising the acts of:
    (a) using an object modeling tool executing from a non-transitory machine-readable medium on a first computing appliance, selecting a set of queues for the queue network from a larger set of pre-programmed queues and instantiating the queue network by creating flow paths between the queues, the queues comprising programmed processes for moving defined work objects sequentially from queue input to queue output, and the flow paths comprising software mechanisms for moving defined work objects from queue output of one queue to queue input of another;
    (b) deploying the queue network defined in step (a) to individual ones of a plurality of processing nodes, each processing node comprising a processing unit and coupled data storage, the processor nodes connected to the first computing appliance by a digital network.

2. The method of claim 1, wherein in act (a), the object modeling tool is a GUI and the specified queues include, but are not limited to, one or more conduit queues, one or more workflow queues, and one or more user queues and external application integration instances to enable external access to those queues.

3. The method of claim 1 wherein in act (a), creating flow paths includes identifying basic queues, super queues and all of the allowable flow paths for work objects between the queues in the network.

4. The method of claim 3 wherein basic queues are used to form the basis of all other defined queues used in a queue network, and super queues are enhanced versions of basic queues.

5. The method of claim 4 wherein basic queues and super queues are elements that couple conduit, workflow and user queues together to form a queue network.

6. The method of claim 1, wherein in act (b), each of the processing boundaries host one or more instances of a communications broker.

7. The method of claim 6 wherein the totality of communications brokers within a topology coordinates and orchestrates interactions with external systems.

8. The method of claim 1 wherein in act (b), the digital network by which the plurality of processing boundaries are interconnected is the Internet network, an Ethernet network, a municipal area network (MAN), a corporate or private wide area network (WAN), or a combination of these and any sub-networks.

* * * * *